United States Patent [19]

Klosterman

[11] Patent Number: 5,628,929

[45] Date of Patent: May 13, 1997

US005628929A

[54] THERMAL CONTROL APPARATUS AND METHOD

[75] Inventor: Kurt Klosterman, Gurnee, Ill.

[73] Assignee: Abbott Laboratories, Abbott Park, Ill.

[21] Appl. No.: 322,666

[22] Filed: Oct. 13, 1994

[51] Int. Cl.[6] .................................................. H05B 1/02
[52] U.S. Cl. .......................... 219/497; 219/209; 219/501; 219/505; 374/1; 364/571.03
[58] Field of Search .................................. 219/450–453, 219/488, 497, 501, 505, 509, 508, 494, 209, 210; 374/1–3; 364/571.01, 571.04, 571.02, 571.03

[56] References Cited

U.S. PATENT DOCUMENTS

| | | | |
|---|---|---|---|
| 3,699,800 | 10/1972 | Waldron | 73/1 F |
| 3,890,836 | 6/1975 | McKenzie et al. | 73/168 |
| 4,041,382 | 8/1977 | Washburn | 324/65 R |
| 4,209,837 | 6/1980 | Brown | 364/117 |
| 4,315,413 | 2/1982 | Baker | 62/180 |
| 4,761,539 | 8/1988 | Carmean | 219/497 |
| 4,891,497 | 1/1990 | Yoshimura | 219/241 |
| 4,901,257 | 2/1990 | Chang et al. | 364/571.01 |

FOREIGN PATENT DOCUMENTS

| | | |
|---|---|---|
| 0670481 | 6/1995 | European Pat. Off. |
| 2319154 | 2/1977 | France . |
| 2254452 | 7/1992 | United Kingdom . |

*Primary Examiner*—Mark H. Paschall
*Attorney, Agent, or Firm*—Mark C. Bach

[57] ABSTRACT

Embodiments described herein provide methods and apparatuses for thermally controlling an instrument. According to one embodiment, an apparatus includes a heater and a source of electrical energy electrically connected with the heater for energizing the heater to produce thermal energy. A driver is electrically connected with the heater and the source of electrical energy for controlling application of electrical energy to the heater. A sensor is electrically connected with the heater for detecting thermal energy produced by the heater responsive to the electrical energy from the source of electrical energy. A controller is electrically connected with the driver and the sensor for controlling production of thermal energy by the heater responsive to electrical energy from the source of electrical energy. Another embodiment provides a method in which a heater is electrically connected with a relatively reduced thermal energy reference resistor. An amplifier operatively associated with the heater slews to a relatively reduced thermal energy value which is recorded in memory. An algorithm controlling the heater is updated. The heater is electrically connected with a detector for sensing thermal energy produced by the heater. The amplifier slews to a value associated with the detector.

6 Claims, 12 Drawing Sheets

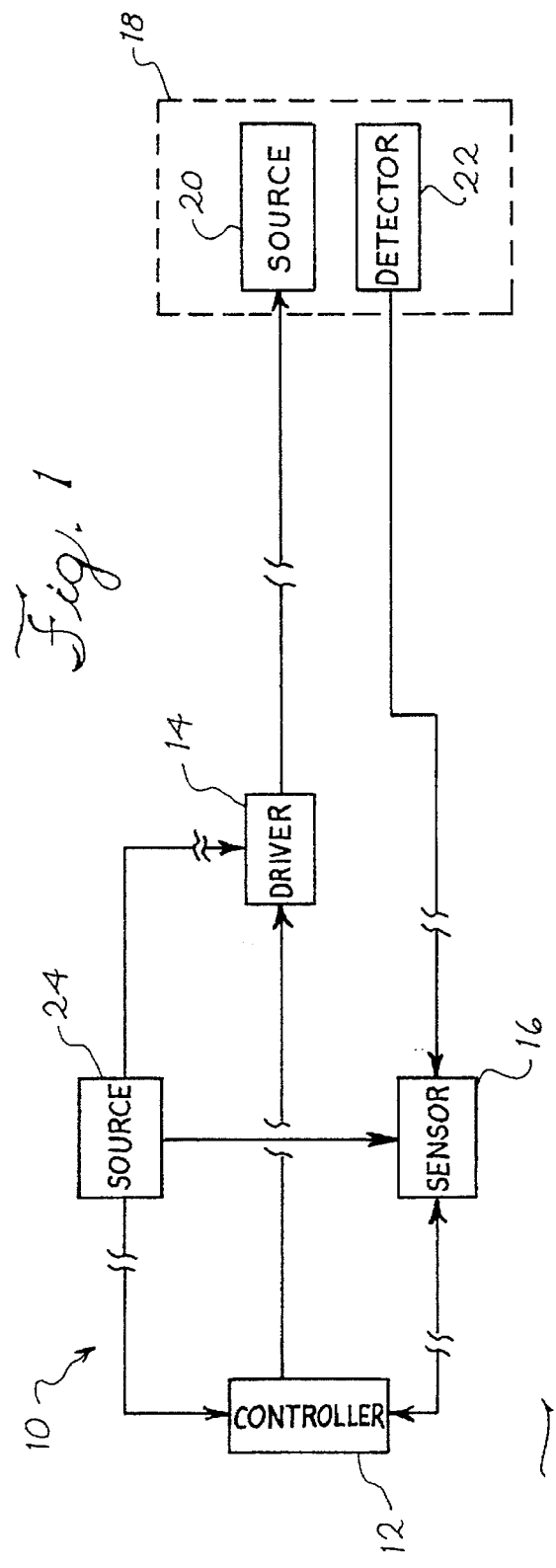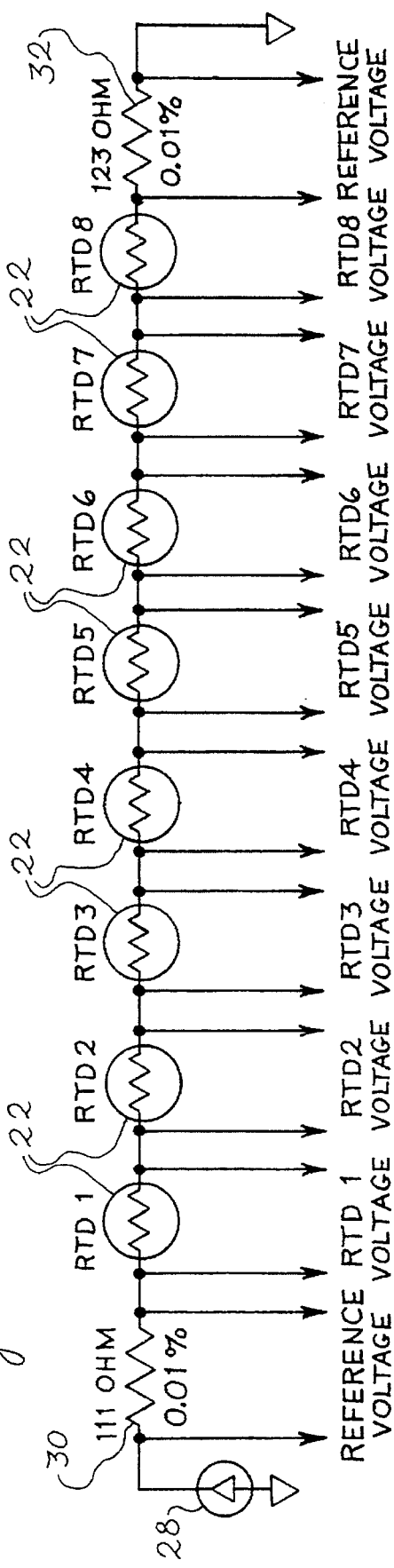

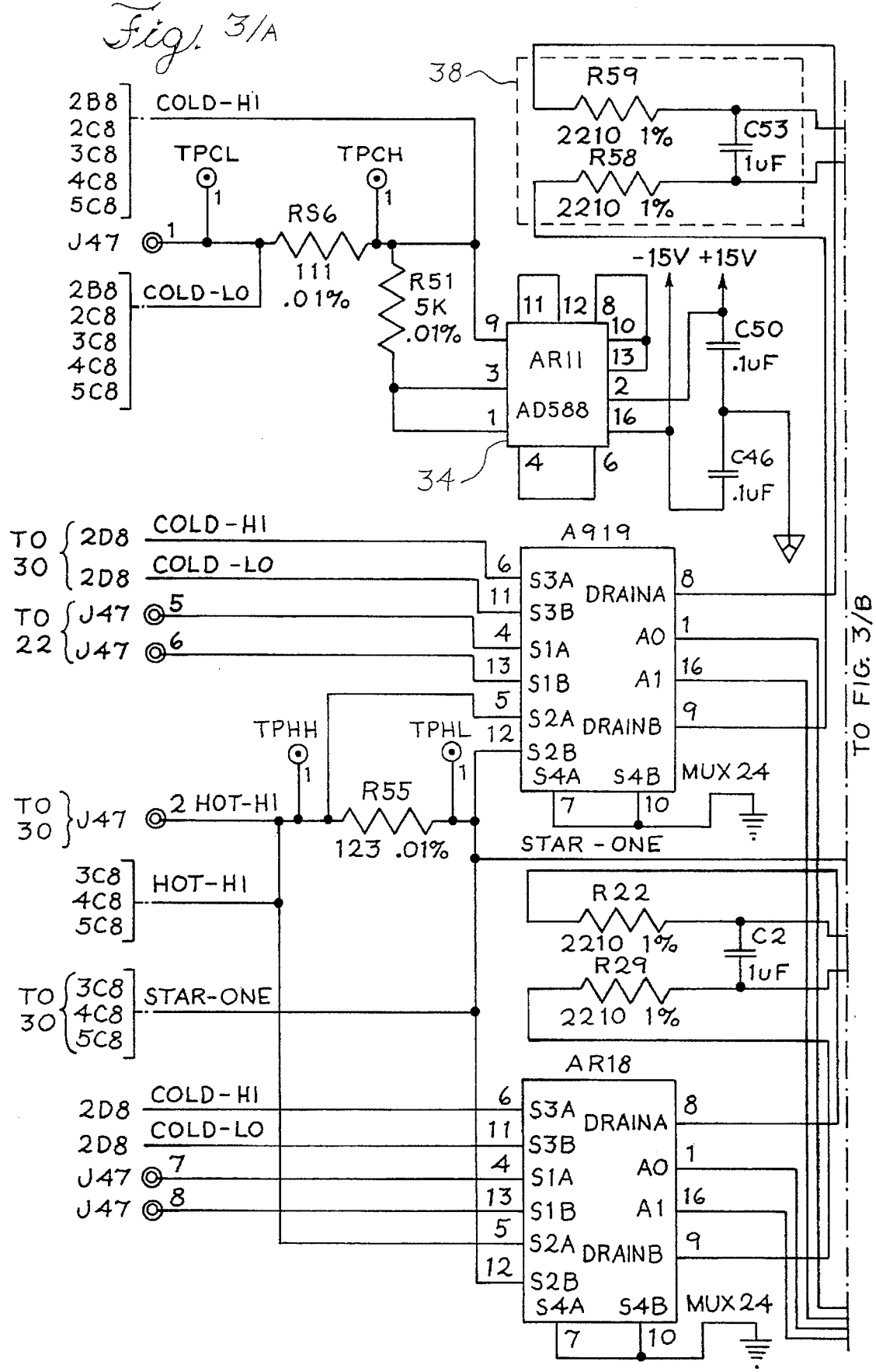
Fig. 3/A

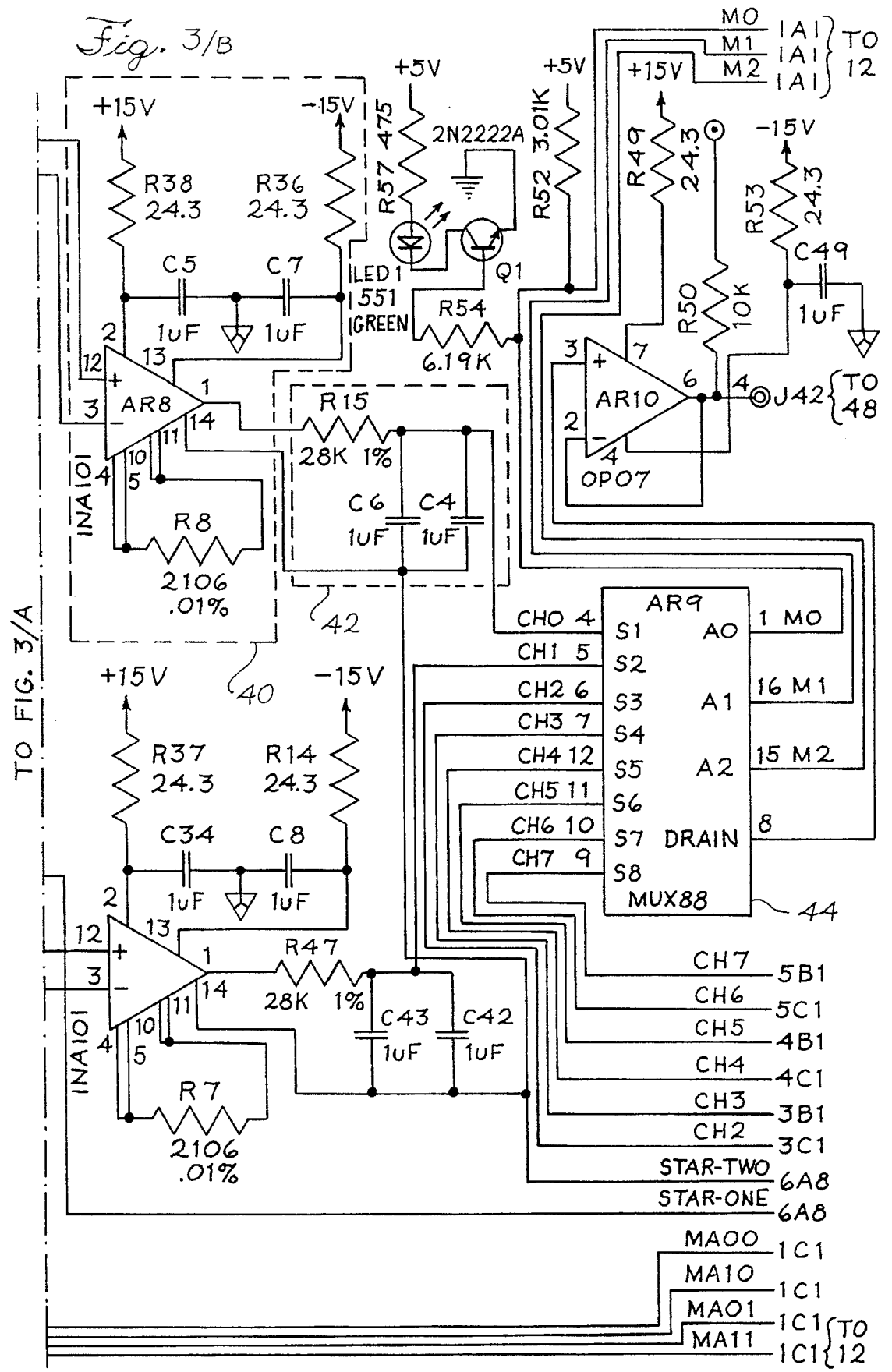
Fig. 3/B

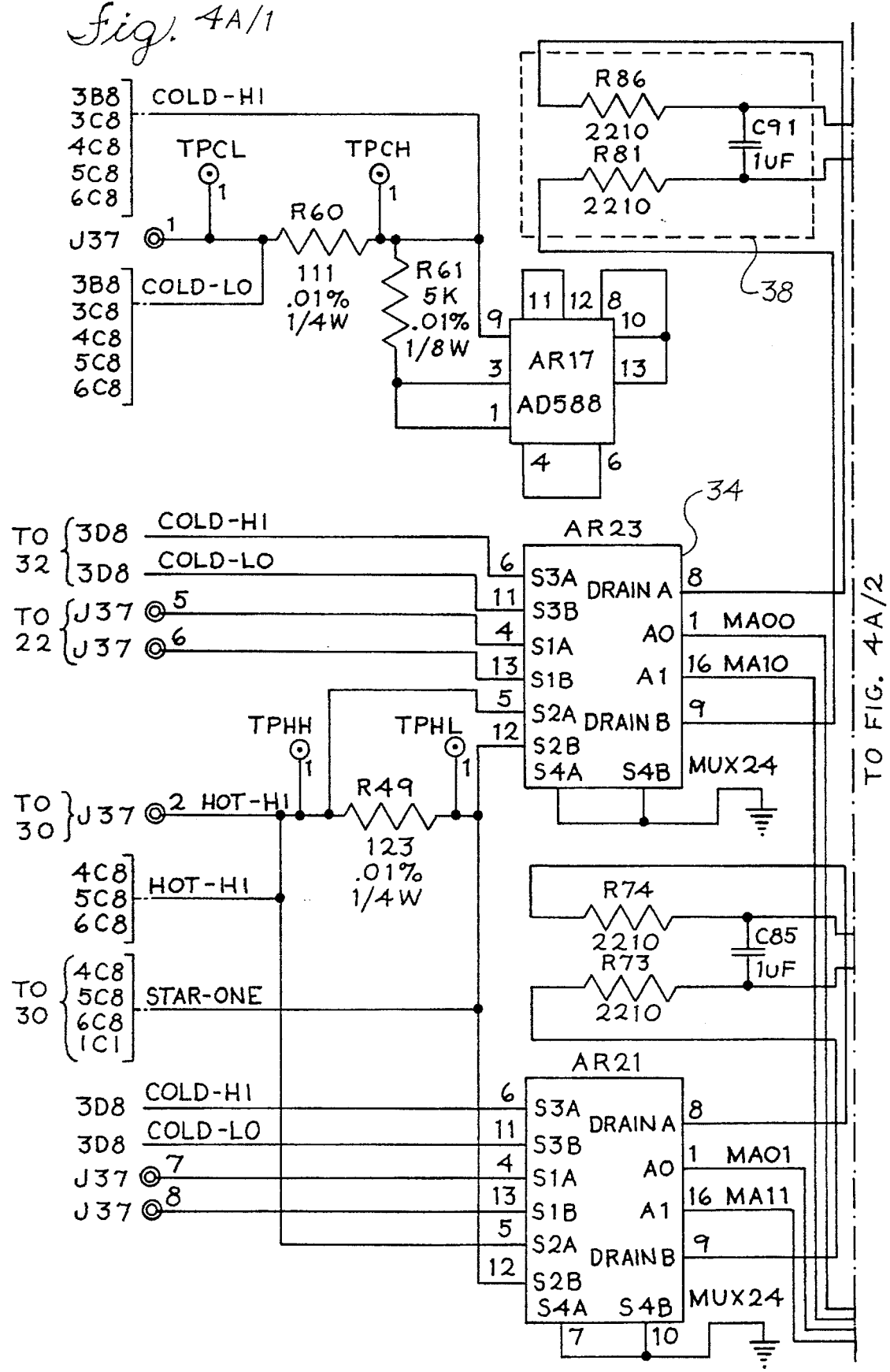
Fig. 4A/1

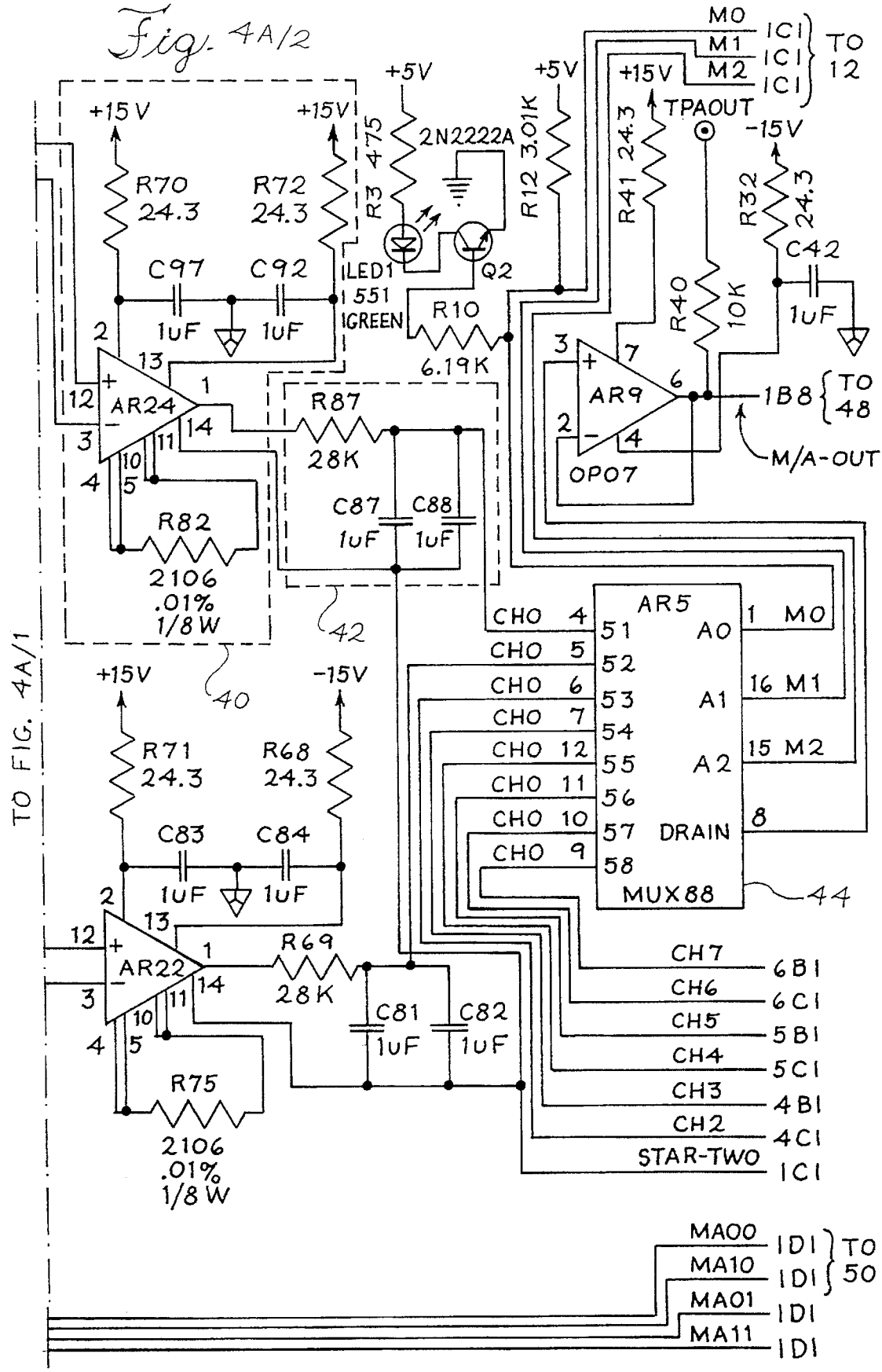
Fig. 4A/2

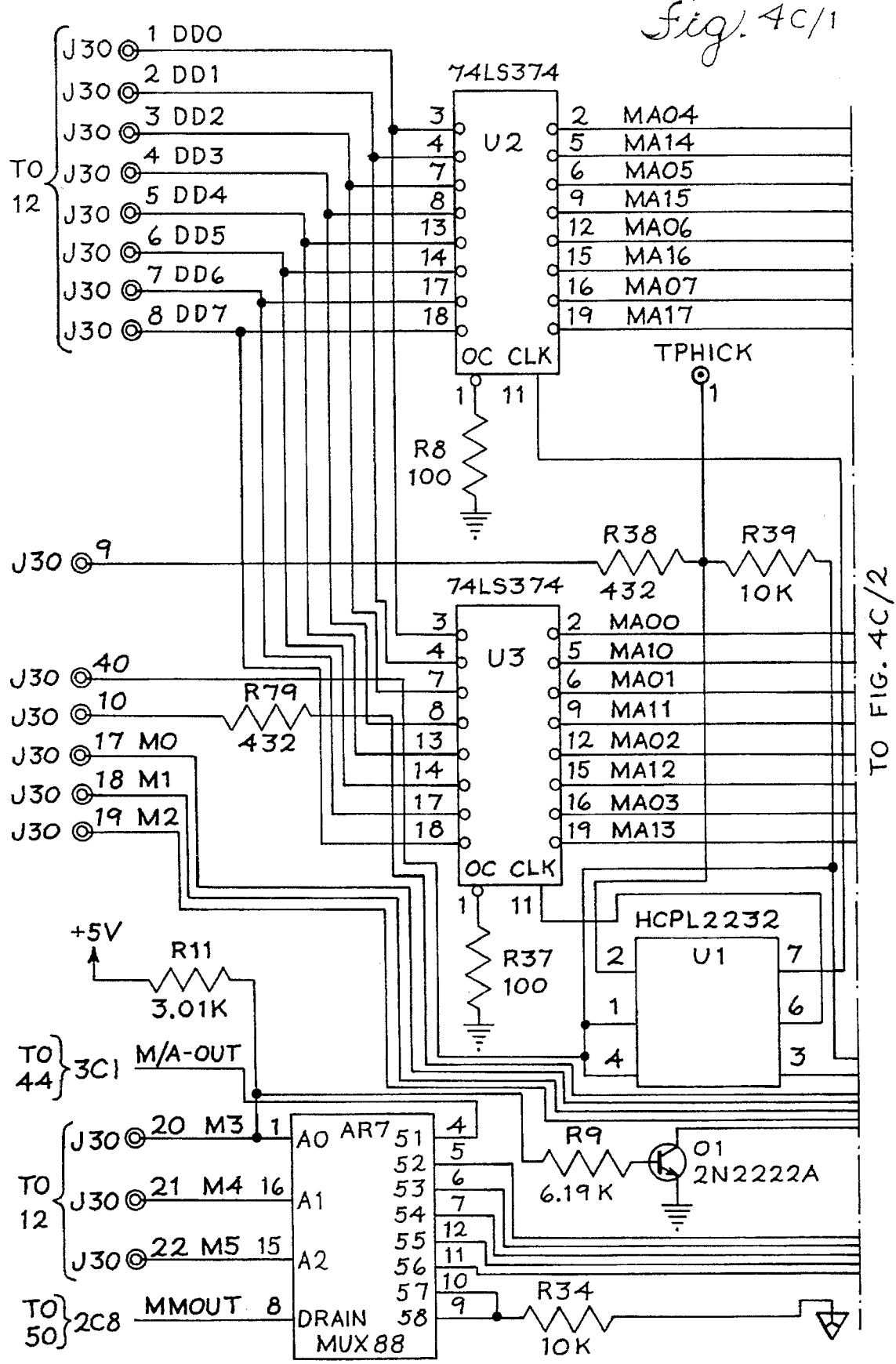
Fig. 4C/1

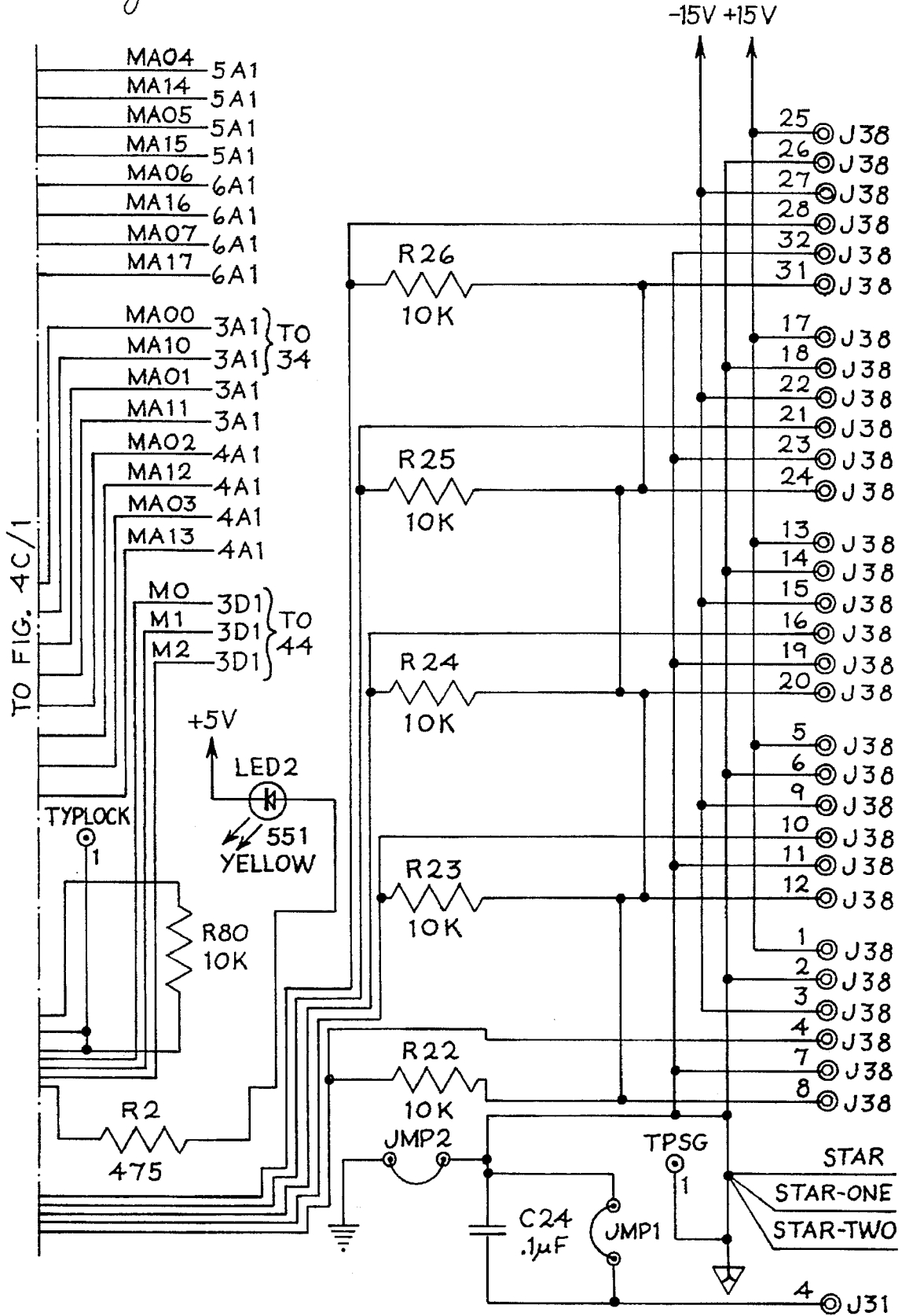
Fig. 4c/2

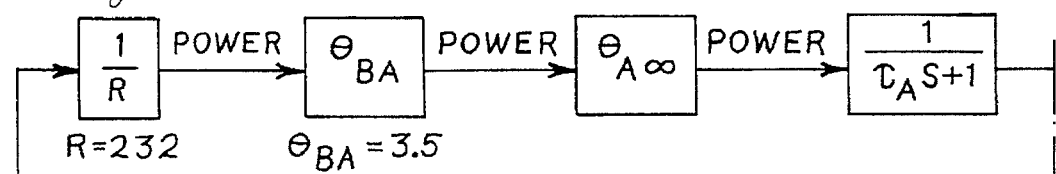
Fig. 6A
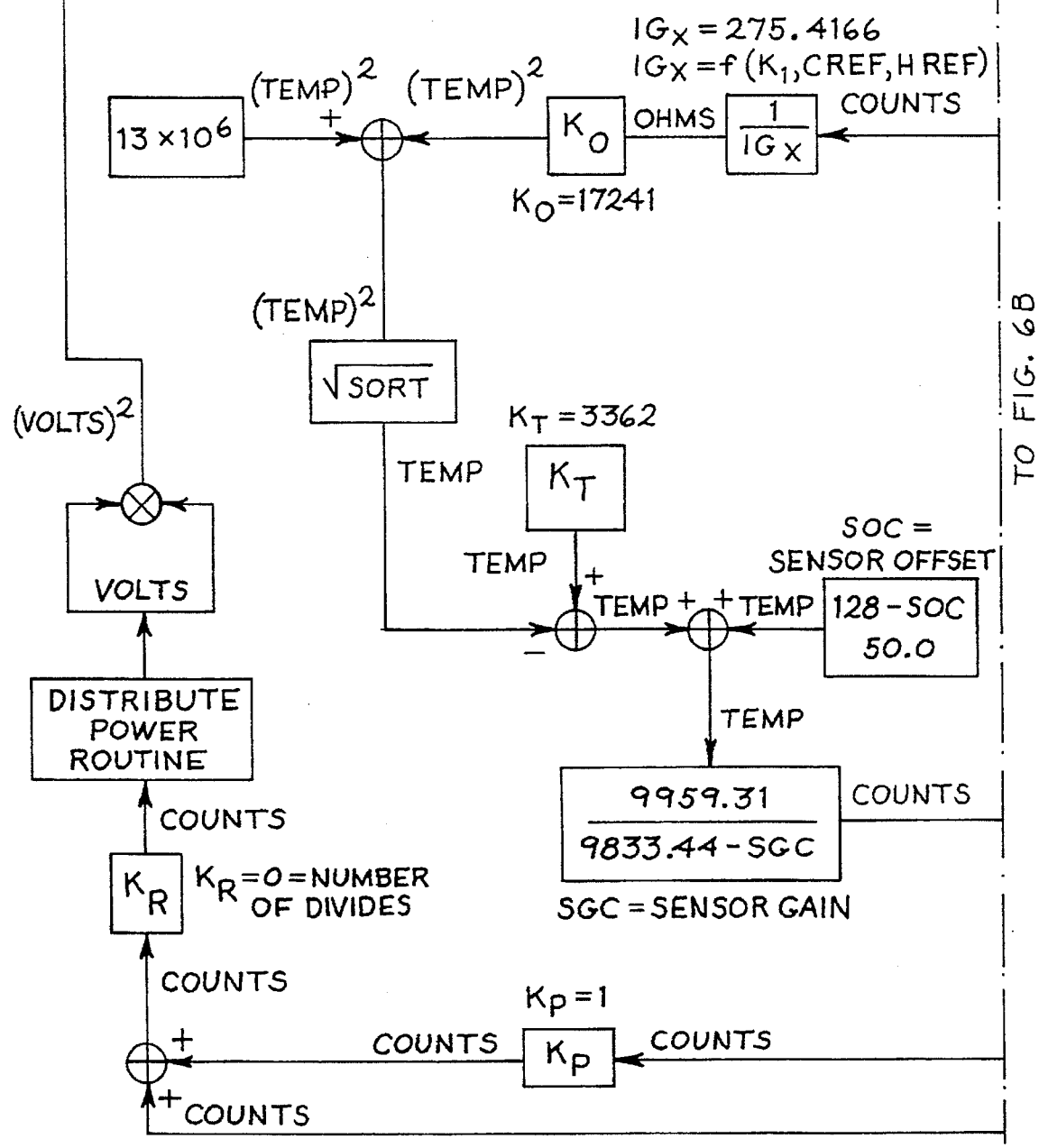

Fig. 6B
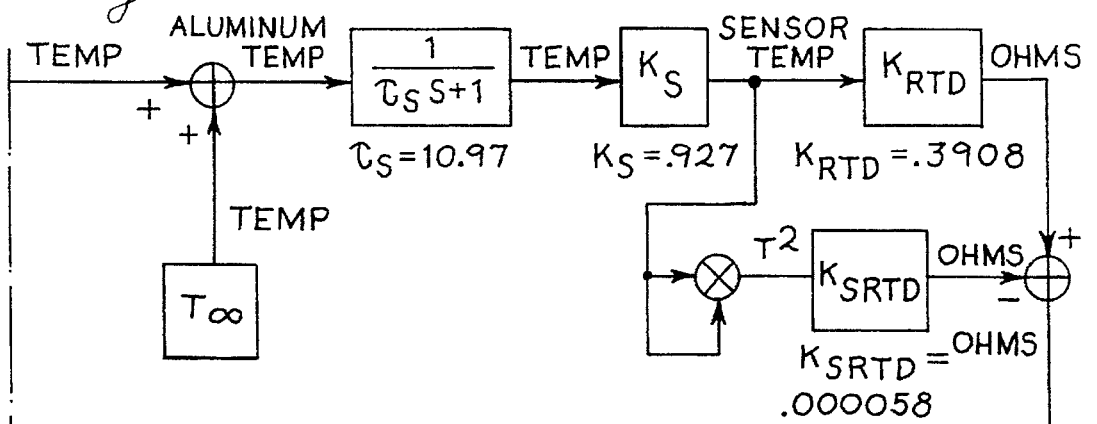
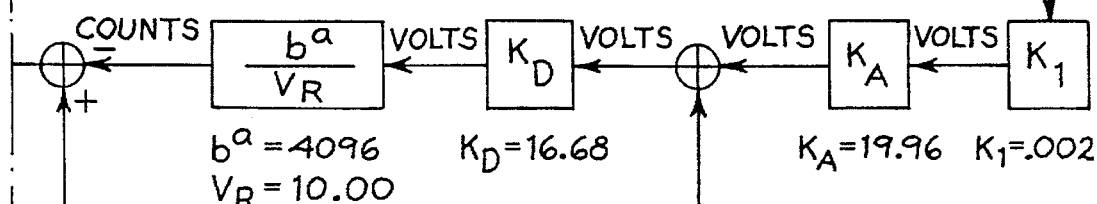
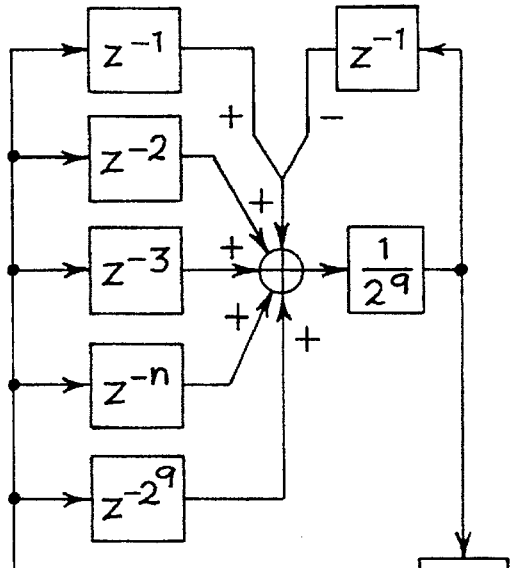

5,628,929

THERMAL CONTROL APPARATUS AND METHOD

BACKGROUND OF THE INVENTION

Embodiments described herein generally relate to an apparatus and a method for controlling temperature. More specifically, the embodiments relate to an apparatus and a method providing thermal control of an element of an analytical instrument.

Analytical instruments are available for performing a number of functions. Some analytical instruments perform medical tests on biological samples, such as human blood and the like. These medical tests may determine if, for example, a human blood sample is infected with the AIDS virus. To perform the medical tests, the analytical instrument may mix the blood sample with another fluid, such as reagents and the like. The blood sample reacts with the added fluid. For some of these reactions between the added fluid and the blood sample to take place as intended, it may be desirable to maintain the blood sample/added fluid mixture at a specific temperature. The mixture may need to be kept at that specific temperature for a predetermined period of time. This time period may be referred to as an "incubation period." Similar concerns about appropriate temperatures for appropriate times may relate to the blood sample and the added fluid separately before mixing.

To keep the blood sample/added fluid mixture at the desired temperature for the desired time period, the analytical instrument may be provided with a heater of sorts. The heater may be positioned near to a vessel holding the blood sample/added fluid mixture. A controller is associated with the heater for insuring that the heater supplies the vessel, and thus the mixture, with sufficient heat energy to keep the mixture at the desired, specific temperature for the desired time.

If the mixture were not kept at the specific temperature for the specific time period, then the analytical instrument may not be able to perform the medical tests as intended. For instance, the instrument may not be able to obtain correct information about the blood sample. Assuming the blood sample were infected with the AIDS virus, if the blood sample/added fluid mixture were not kept at the desired temperature for the desired time period, then the analytical instrument may tell an operator of the instrument that the blood sample is not infected with the AIDS virus. This is undesirable.

Many things may cause the mixture not to be kept at the desired temperature for the desired time period. For instance, the heater may degrade or age over time. The controller may have difficulty in controlling the heater. As the heater ages, the heater may not be able to provide the appropriate heat to the mixture for the proper time period. The heat applied to the mixture by the heater may change or vary over time. Thus, it can be appreciated that it is desirable to provide an apparatus and a method for controlling the heater and the heat applied to the blood sample, added fluid and mixture such that those things are kept at the proper temperature for the proper time period.

SUMMARY OF THE INVENTION

Embodiments described herein provide methods and apparatuses for thermally controlling an instrument. According to one embodiment, an apparatus includes a heater and a source of electrical energy electrically connected with the heater for energizing the heater to produce thermal energy. A driver is electrically connected with the heater and the source of electrical energy for controlling application of electrical energy to the heater. A sensor is electrically connected with the heater for detecting thermal energy produced by the heater responsive to the electrical energy from the source of electrical energy. A controller is electrically connected with the driver and the sensor for controlling production of thermal energy by the heater responsive to electrical energy from the source of electrical energy.

Another embodiment provides a method in which a heater is electrically connected with a relatively reduced thermal energy reference resistor. An amplifier operatively associated with the heater slews to a relatively reduced thermal energy value which is recorded in memory. An algorithm controlling the heater is updated. The heater is electrically connected with a detector for sensing thermal energy produced by the heater. The amplifier slews to a value associated with the detector.

In an additional embodiment, a method of thermally controlling an instrument includes electrically connecting a heater with a relatively increased thermal energy reference resistor. An amplifier operatively associated with the heater is allowed to slew to a relatively increased thermal energy value. The relatively increased thermal energy value is recorded in memory. An algorithm controlling the heater is updated. The heater is electrically connected with a detector for sensing thermal energy produced by the heater. The amplifier is allowed to slew to a value associated with the detector.

A further embodiment provides a method of thermally controlling an instrument wherein a heater is energized such that the heater produces thermal energy. At least one of a relatively increased temperature reference value and a relatively reduced temperature reference value is consulted while the heater is energized to calibrate the heater.

Yet another embodiment comprises a method in which a heater is energized with electrical energy to produce thermal energy. A thermal energy level produced by the heater is detected with a detector operatively associated with the heater. The detected thermal energy level is compared with a predetermined thermal energy level. The electrical energy applied to the heater is changed such that the detected thermal energy level is substantially similar to the predetermined thermal energy level.

BRIEF DESCRIPTION OF THE DRAWINGS

FIG. 1 is a general schematic block diagram of an apparatus and a method for thermal control;

FIG. 3 is a schematic diagram of a slave sensor comprising the apparatus of FIG. 1;

FIGS. 4A, 4B and 4C illustrate schematically a master sensor comprising the apparatus of FIG. 1;

FIG. 5 is a schematic diagram of a circuit comprising part of the apparatus of FIG. 1; and FIG. 6 is a flow chart illustrating operation of the apparatus and method of FIG. 1.

DETAILED DESCRIPTION OF PREFERRED EMBODIMENTS

Figure 2A:
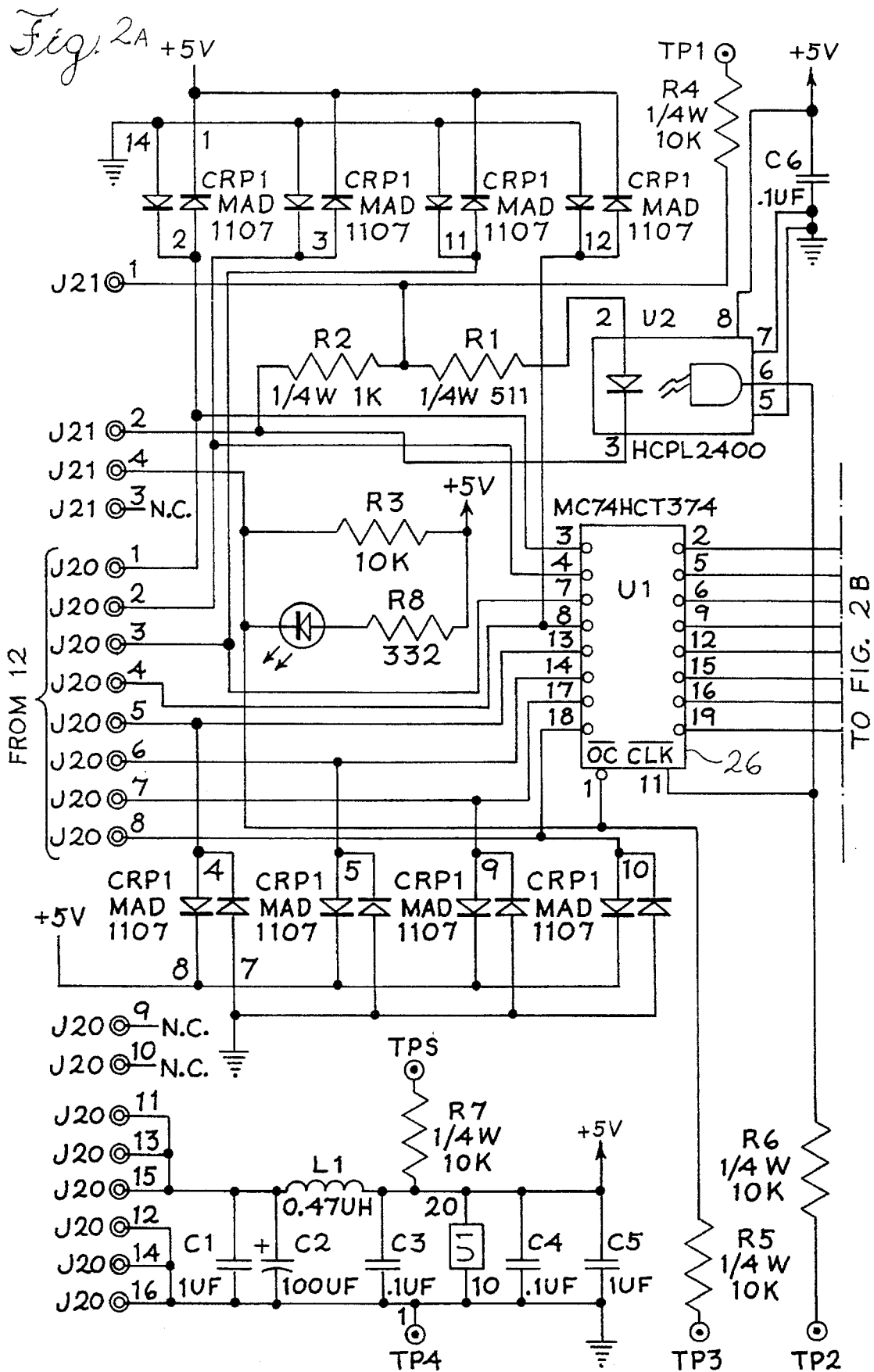
FIG. 2 is a schematic diagram of a driver comprising the apparatus shown in FIG. 1.

Embodiments disclosed herein relate to apparatuses and methods providing thermal control. The apparatuses and methods may be utilized in a number of employments. However, for the sake of clarity of understanding, the embodiments will be discussed with respect to their employment with an analytical instrument. For instance, the embodiments may be used with the instruments and methods disclosed in U.S. Pat. Nos 5,006,309, 5,089,424, 5,120,199, 5,185,264, 5,198,368 and 5,244,630. Those patents are assigned to the assignee of the present case and the disclosures thereof are specifically incorporated herein, in their entirety, by this reference. It is to be noted that elements of the disclosed embodiments may be combined in any appropriate fashion to arrive at yet further embodiments. Thus, the scope of the claims is not to be limited to the embodiments disclosed herein. To clarify relations among the apparatuses and the methods, both will be discussed simultaneously.

One embodiment 10 of a thermal control apparatus and method is illustrated in FIG. 1. The embodiment 10 generally comprises a controller 12, a driver 14, a sensor 16, and a heater 18, shown in dotted lines in FIG. 1. The heater 18 comprises a source 20 of thermal energy and a detector 22 that detects thermal energy in the heater 18. The controller 12 is electrically connected with the driver 14 and the sensor 16. The driver 14 is electrically connected with the source 20 of thermal energy. The sensor 16 is electrically connected with the detector 22. A source 24 of electrical energy is electrically connected with the controller 12, the driver 14 and the sensor 16 for supplying those elements with electrical energy.

In an exemplary embodiment, the controller 12 may be a computer having memory and running appropriate routines. As referred to herein, memory may be a RAM, a ROM, an EPROM, a SRAM and the like. In one particular embodiment, the controller 12 comprises a 68HC11 microcontroller available from Motorola (Schaumburg, Ill.). The controller 12 may include a digital logic device and memory that are electrically connected with at least one of the driver 14 and the sensor 16. The controller 12 performs appropriate routines, discussed in detail later, for controlling thermal energy in the heater 18.

The driver 14 generally controls application of electrical energy from the source 24 to the source 20 of thermal energy in the heater 18. Application of electrical energy by the driver 14 to the source 20 is directed by the controller 12. The driver 14 may comprise, in one embodiment, a solid state relay and the like.

The sensor 16 monitors an electrical signal generated by the detector 22 indicative of thermal energy present in the heater 18. The sensor 16 sends a complementary signal to the controller 12 such that the controller 12 is provided with information representing the thermal energy present in the heater 18.

The heater 18, in an exemplary embodiment, may comprise a thermally conductive body, made of a metal such as aluminum and the like, with which the source 20 is operatively associated. The source 20 may be operatively associated with the body through a suitable technique, such as adhesive and the like. The body, in some embodiments, may be constructed to provide at least one of a cover for an item processing path in the instrument, a mechanism for transferring thermal energy from the source 20 to the item being processed, and structural support for instrument components, such as dispensers, washers, aspirators, etc. The body is constructed and positioned to assist in providing the desired temperature for the desired time period to the item being processed, such as a biological sample and the like, by the instrument.

In one embodiment, the source 20 of thermal energy may be an electrical heating element, such as a resistive foil heating element with a nominal resistance of about 232 Ohms and a voltage rating of about 120 Volts$_{rms}$. The source 20 may incorporate a thermal energy limiter, such as a self-resetting thermal limit switch and the like. In a specific embodiment, the self-resetting thermal limit switch may interrupt flow of electrical current through the source 20 when the temperature of the switch approaches about 80° Celsius and may reset to again allow current flow through the source 20 when the temperature of the switch approaches about 60° Celsius.

The detector 22, in an exemplary embodiment, is operatively associated with the body through suitable means, such as an adhesive and the like. The detector 22 may be of any construction that provides an electrical signal indicative of the thermal energy associated with the heater 18. In one specific embodiment, the detector 22 may be a SDI-GR2101 resistive temperature detector available from SDI of Attleboro, Mass. This resistive temperature detector has an electrical resistance R (in Ohms) of about $$R = 100 + 0.3908 \cdot T - 5.802 \times 10^{-5} \cdot T^2$$

where T is the temperature in degrees Celsius.

To provide greater understanding, a particularly specific embodiment will now be discussed. It is to be noted that the specific details given are for illustration only as do not limit the claims. Like reference numerals are used for similar structures to provide coherency.

A particular embodiment is illustrated in FIGS. 2 through 6. Those Figures show an embodiment which provides thermal control for a plurality of, specifically six, item processing paths in an analytical instrument. At least one of the processing paths may not be thermally controlled as the other paths are controlled. Each processing path includes a plurality of, specifically eight, heaters 18. At least one driver 14 (FIG. 2) and at least one sensor 16 (FIG. 3 or FIGS. 4A, 4B and 4C) are dedicated to each processing path. Thus, one controller 12 is electrically connected with six drivers 14 and six sensors 16. One of the sensors 16 is a master sensor 46 (FIGS. 4A, 4B and 4C) which is discussed in detail later. All other sensors 16 associated with the master sensor 46 are slaves to the master 46. Each of the drivers 14 and sensors 16 are respectively electrically connected with suitable source 20 and detector 22 pairs. There is one source 20 and detector 22 pair for each of the eight heaters 18 along each of the six item processing paths. Each heater 18 comprises a body, a source 20 and a detector 22.

Figure 2B:
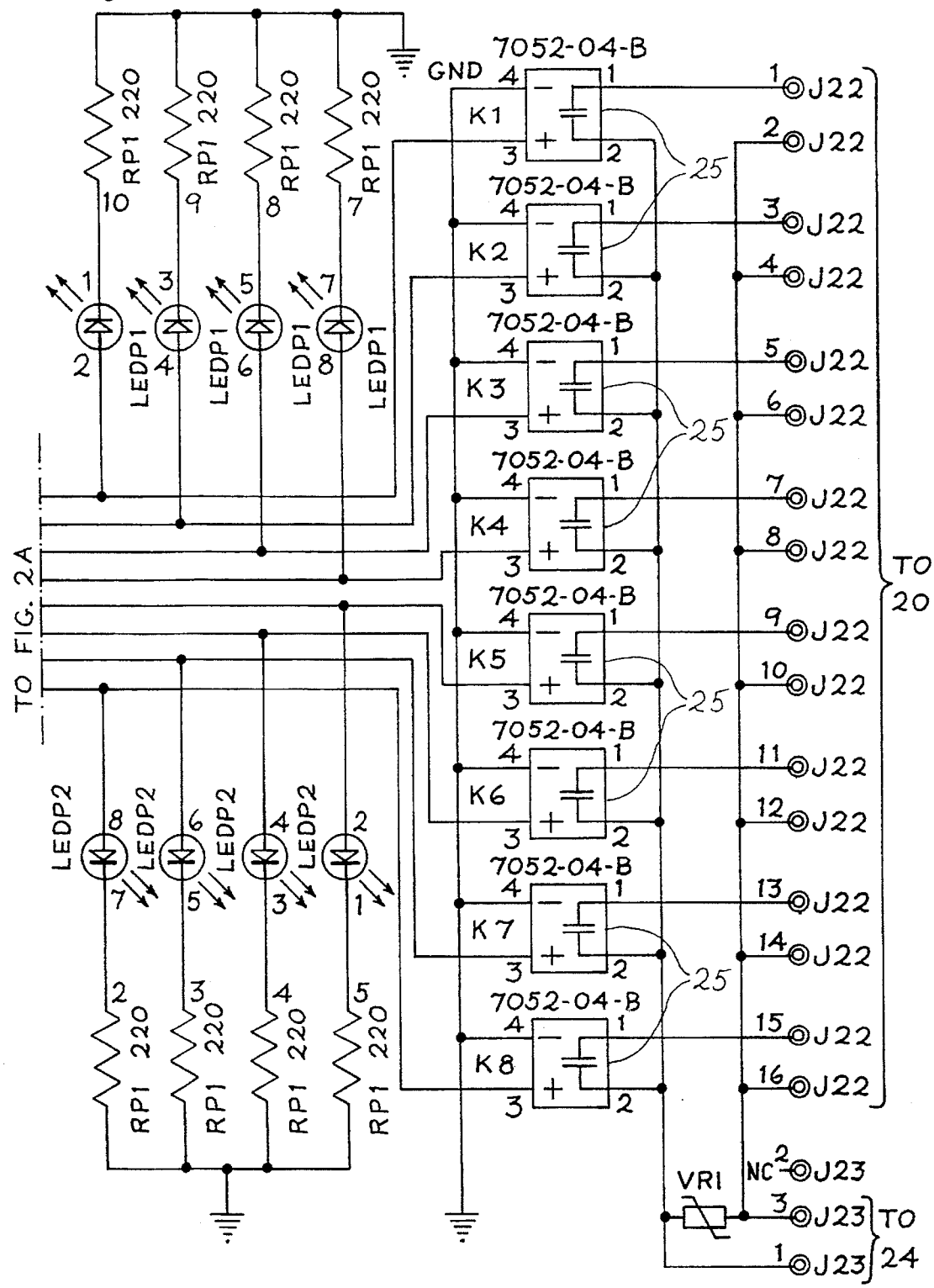

As shown in FIG. 2, each driver 14 contains a plurality, eight in an exemplary embodiment, of control devices 25. The control device 25 may be a solid state relay and the like. In an exemplary embodiment, the control device 25 is an about 140 Volt, about 3 amp, about 50/60 Hertz solid state relay, such as model 70S2-04-B available from Grayhill, Inc. of La Grange, Ill. Each of the control devices 25 is electrically associated with a source 20 and determines application of electrical energy from the source 24 of electrical energy to the associated source 20 of thermal energy.

The driver 14 may comprise a latch circuit 26. The latch circuit 26 may be a data storage device, such as a flip-flop array and the like. The controller 12 sends an electrical signal (digital) to the latch circuit 26. The latch circuit 26 is electrically connected with the control devices 25 such that the control devices 25 determine application of electrical energy from the source 24 of electrical energy to the source 20 of thermal energy responsive to a signal from the controller 12.

FIG. 5 shows electrical connections among a plurality, specifically eight, of detectors 22 associated with one of the item processing paths. A source 28 of substantially constant electrical current provides a substantially constant electrical current of about 2.0 milliamperes through a relatively reduced temperature reference resistor 30, the detectors 22 and a relatively increased temperature reference resistor 32 which are electrically connected in series. The electrical voltage across each resistor 30 or 32 or detector 22 is the product of the current (about 0.002 amperes in an exemplary embodiment) and the resistance (in Ohms) of the detector 22 or resistor 30 or 32. This is an application of the well known formula Voltage=Current×Resistance.

This voltage is conveyed by electrical connections on both sides of each detector 22 to an associated source signal selector 34 in the appropriate sensor 16 for the particular processing path. In a particular embodiment, the resistors 30 and 32 are precision resistors of nominal resistances. In an exemplary embodiment, the resistor 30 has a nominal resistance of about 111 Ohms while the resistor 32 has a nominal resistance of about 123 Ohms. Voltages across the resistors 30 and 32 are applied by electrical connections on both sides of the resistors 30 and 32 to all of the source signal selectors 34 in the sensor 16 associated with the appropriate processing path.

The general construction of an exemplary embodiment of the slave sensor 16 is shown in FIG. 3. The sensor 16 contains a plurality, specifically eight, station circuits 36. Each of the station circuits 36 includes a source signal selector 34, a prefilter 38, an amplifier 40 and a postfilter 42. The source signal selector 34 selectively electrically connects the associated station circuit 36 to one of two reference signals, corresponding to the relatively increased and reduced temperatures, or to the detector 22 associated with a specific heater 18. In one embodiment, the source signal selector 34 may be a multiplexer. The controller 12 determines to which of the two reference signals or the detector 22 the station circuit 36 is connected. A specific embodiment of the prefilter 38 is a single pole lowpass filter with a cutoff frequency of about 226 Hertz. The amplifier 40 has a gain of about 19.96. A specific embodiment of the postfilter 42 is a single pole lowpass filter with a cutoff frequency of about 18 Hertz.

Figure 4B:
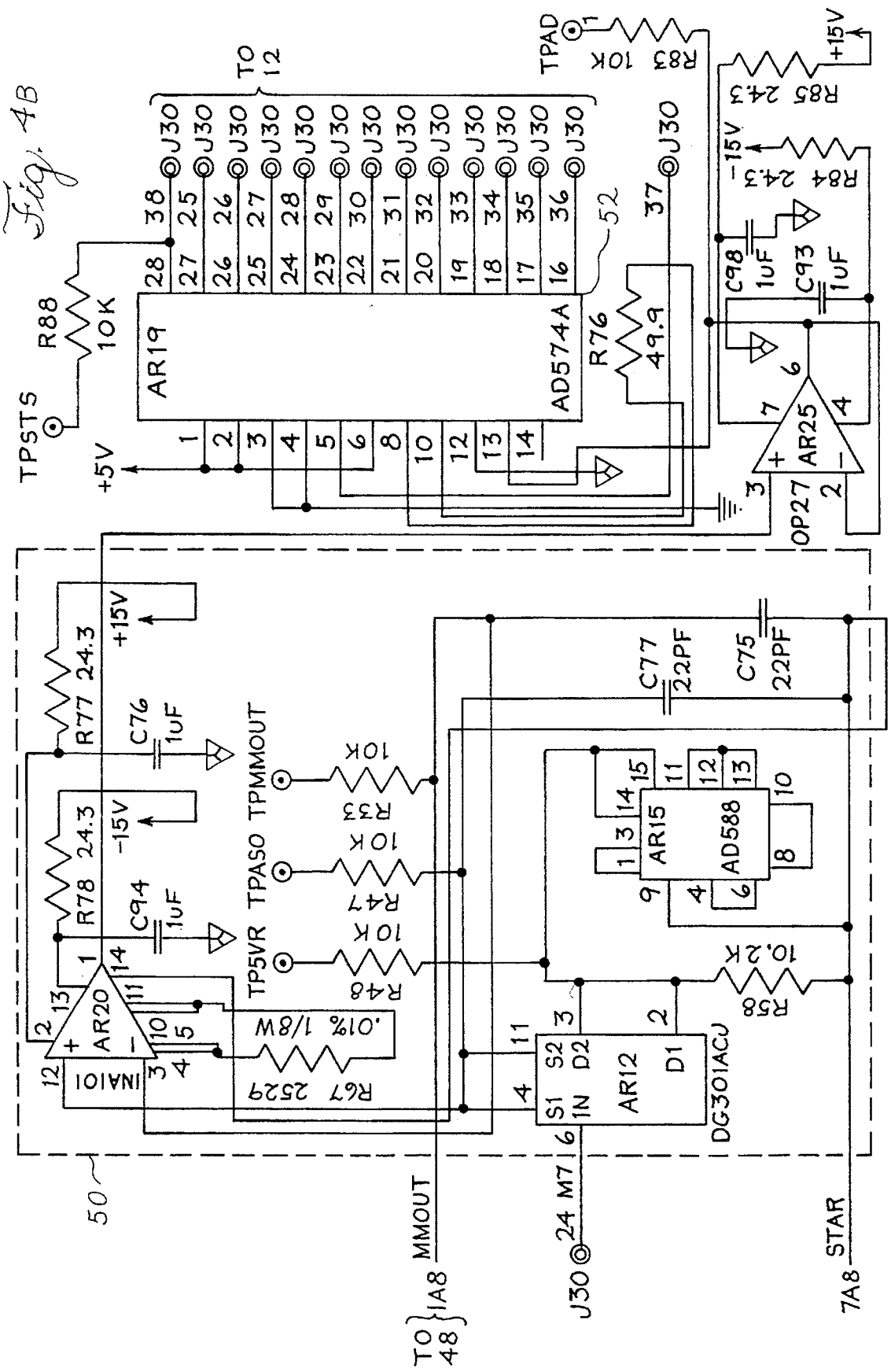

Each station circuit 36 in a given sensor 16 is electrically connected with a station signal selector 44. The station signal selector 44, in an exemplary embodiment, may be a multiplexer. The station signal selector 44 selectively electrically connects an output of one of the station circuits 36 to the master sensor 46, illustrated schematically in FIGS. 4A, 4B and 4C. Comparison of FIG. 3 with FIGS. 4A, 4B and 4C illustrates similarities and differences among the slave sensors 16 and the master sensor 46. The selective electrical connection performed by the station signal selector 44 is determined by the controller 12. The master sensor 46 comprises a channel signal selector 48 which selectively electrically connects the outputs of all station signal selectors 44 to a range selection device 50. The channel signal selector 48 may be a multiplexer. The range selection device 50 may be a substraction circuit that subtracts one of the two selectable signals from the output of the channel signal selector 48 and amplifies the resulting signal by a factor of about 16.68. Output of the range selection device 50 is applied to a 12-bit analog to digital converter 52 which is electrically connected with the range selection device 50. Output of the converter 52 is electrically connected to the controller 12.

Further details of the embodiments disclosed herein may become clear with reference to the following operational description, which is given as an example only. The embodiment 10 maintains a desired temperature in a processing path within an instrument. In this embodiment, thermal control is effected in periodic temporal cycles of about 683 msec. In each cycle, the thermal energy associated with the processing path is detected, corresponding data manipulation occurs, and the heaters 18 for that processing path are energized in a manner appropriate to maintain the associated thermal energy at the desired value.

All operations are controlled by digital electrical signals from the controller 12 to the other components in the system discussed above. Operation of the controller 12 is governed by an appropriate routine contained in memory available to the embodiment 10. Accordingly, the following example contains references, where appropriate, to portions of a source code, written in C, of the routine which is included at the end of this description and before the claims. Specifically, the following text refers to certain lines in the source code at illustrative locations. When a numbered STEP is encountered in the following text, reference should be made to the relevant portion of the source code, indicated by the same STEP number, to gain a more complete understanding of the routine.

The routine begins with thermal energy or temperature detection. The temperature at each heater 18 is detected by the associated detector 22 and sensor 16. A voltage is generated across a detector 22 due to the substantially constant current of about 2.0 milliamperes from the constant current source 28 for the processing path corresponding to the heater 18. This voltage is applied to the source signal selector 34. During the temperature detection process, the source signal selector 34 monitors voltage across the detector 22 and applies that voltage to an associated prefilter 38. The prefilter 38 reduces electrical noise and applies the voltage to the amplifier 40. The amplifier 40 amplifies the electrical signal associated with the applied voltage by a factor of about 19.96 and sends the amplified signal through the postfilter 42 which further reduces electrical noise. The output of the postfilter 42 is one of the input signals of the station signal selector 44.

The controller 12 sends an electrical signal (digital) to address inputs of the station signal selector 44 and the channel signal selector 48. Responsive to the signal from the controller 12, the selectors 44 and 48 cause voltage across the desired heater's 18 detector 22 to be sent to the range selection device 50. The range selection device 50 subtracts one of two voltages from the channel signal selector 48 output to provide a range, in an exemplary embodiment at least two ranges, of sensor operation.

In an exemplary embodiment, a first range is approximately from about 5° Celsius to about 35° Celsius. A second range is approximately from about 30° C. to about 60° C. The first range is utilized by the routine during the embodiment 10 startup phase. The second range is utilized by the routine during an operation control process. The subtractor circuit of the range selection device 50 shifts voltage from the detector 22 so that, when at a relatively low end of a selected temperature range (for example, about 5° Celsius during startup or about 30° Celsius during operation), the resulting signal is at about a high end of the analog to digital converter 52 input range (about 10 volts).

STEP 1

The analog to digital converter 52 converts voltage at its input to a 12 bit digital signal representing the temperature at the relevant heater 18 and sends this 12 bit digital signal to the controller 12. The controller 12 compares the 12 bit digital signal representing the temperature at the relevant heater 18 to a 12 bit reference signal, AD_REF, representing the desired temperature of the related item processing path ($T_{desired}$). The reference signal is calculated as:

$$AD\_REF=0.5+K-(IG*FIXED)$$

where $$FIXED=100.0+(0.3908*T_{desired})-(0.0000580195*T_{desired}^2)$$

STEP 2 and IG and K are constants for each heater 18 determined during calibration, as described later. The numerical difference between the output of the analog to digital converter 52 and AD_REF is statistically offset by about 8 hexadecimal counts and stored in a memory device as a variable called TMP_RESULT.

STEP 3

The controller 12 also contains in suitable memory the values of TMP_RESULT for the relevant heater 18 that were stored from the previous, about 256, heater cycles. The sum of the previous, about 256, TMP_RESULT values, termed RANDY_SUM, is divided by a number equal to the previous number, about 256, of heater cycles to yield an average value of TMP_RESULT for the previous cycles.

STEP 4

The controller 12 multiplies the average value by five and adds the current value of TMP_RESULT to yield a numerical value RESULT, used to control application of electrical energy to the source 20 for the relevant heater 18.

The application of electrical energy to the source 20 is controlled by determining the number of half-cycles of electrical energy that will be applied to the source 20. The application of a half-cycle of electrical energy is termed a pulse. A full heater cycle is defined as about 64 electrical half-cycles, so the maximum amount of electrical energy that could be applied to a given source 20 is about 64 pulses per heater cycle.

The numerical result of the heater control algorithm (RESULT) determines the number of pulses of electrical energy per heater cycle in accordance with the following table:

| STEP 5 | |
|---|---|
| Numerical Result | Pulses per Heater Cycle |
| 0 or less | 1 |
| 1 or 2 | 2 |
| 3 or 4 | 4 |
| 5 or 6 | 8 |
| 7 | 16 |
| 8 (or more in normal control) | 32 |
| 9 or more (only during instrument startup) | 64 |

STEP 6

The pulses for a given source 20 are spread out within the cycle to yield an approximately uniform duty cycle for each source 20.

In a particular embodiment, there are a plurality of heaters 18, each assigned a number from 1 to 8 associated with each of the six processing paths. During control, in an exemplary embodiment, even numbered heaters 18, or the associated sources 20, only receive pulses on even numbered half-cycles, and odd numbered heaters 18, or the associated sources 20, only receive pulses on odd numbered half-cycles, so that no more than about 24 heater sources 20 are energized simultaneously.

STEP 7

The heater control process is adjusted during the startup period, defined as the first 4 of 5 phases. The startup phases last a total of about 30 minutes following energization of the heater control system (about five minutes each for phases 1 through 3, and about fifteen minutes for phase 4). Phase 5 constitutes operation. During phase 1, only the sources 20 for heaters 2 through 4 in each channel may be energized at about full power (about 64 cycles) and the remaining sources 20 are not energized. During phase 2, the sources 20 for heaters 2 through 4 may be energized up to about half power (about 32 cycles), stations 5 and 6 may be energized up to about full power, and the other heater 18 sources 20 remain deenergized. During phase 3, the sources 20 for heaters 2 through 6 may be energized at up to about half power, the source 20 for heater 7 may be energized at about full power, and the source 20 for heater 8 is not energized. During phase 4 (as in operation phase 5), the sources 20 for heaters 2 through 8 may be energized at up to about half power. The source 20 for heater 1 in this exemplary embodiment is never energized.

STEP 8

Referring to FIG. 2, the controller 12 determines which heater sources 20 will be energized for the next electrical half-cycle, and sends this information to the relevant driver latch circuit 26. The latch circuit 26 stores this information until the next electrical half-cycle begins. The heater control devices 25 sense the beginning of the next electrical half-cycle (a zero crossing in the electrical energy supply voltage) and actuate in accordance with the data stored in the latch circuit 26 so that electrical energy is applied to the proper sources 20 for that electrical half-cycle.

To further illustrate, a block diagram of the thermal control system is presented in FIG. 6.

The thermal control system can be calibrated as it operates. Specifically, an "on-the-fly" calibration scheme may be used to automatically correct the thermal control system comprising the embodiment 10 for the effects of thermal irregularities or variances from the desired temperature, such as component aging and drift. In particular, this calibration scheme may be used to correct for long-term changes in the sensor circuits 16.

The calibration scheme generally detects output (digital) resulting from measuring voltages across resistors 30 and 32 of a particular heater's 18 item processing path. The resistors 30 and 32 are assumed to represent the resistances of the detectors 22 for a relatively increased temperature condition (about 123 Ω) and a relatively reduced temperature condition (about 111 Ω). The measured digital values are used by numerical algorithms executed by the controller 10. The values measured in each calibration remain in effect until the next calibration occurs. In an exemplary embodiment, calibration of the heaters 18 in each item processing path occurs within about 30 minutes. When a calibration cycle is finished, another calibration cycle begins. One heater 18 is calibrated at a time. During calibration, the source 20 for a heater 18 being calibrated is energized in a manor substantially similar to an average history of heater 18 operation during the previous (about eight) heater 18 cycles, as recorded in a history matrix which may reside in a suitable memory. The history matrix is not updated during calibration.

Two values for each heater 18 used by the controller 12 and determined during calibration are:

IG=[(digital output from measuring about 111 Ω resistor)
−(digital output from measuring about 123 Ω resistor)
]/12.0 and

K=(IG*111.0)+(digital output from measuring about 111 Ω resistor)

A sequence of steps during calibration is as follows (referring to all of the Figures):

Step 1: The heater 18 to be calibrated is electrically disconnected from its detector 20 and is connected to the relatively reduced temperature reference resistor 30 by switching the heater's 18 source signal selector 34. Essentially, the relatively reduced temperature reference resistor 30 takes the place of the detector 22 in the relevant circuit. An average value of the history matrix is read by software when the heater 18 temperature is requested through steps 2–6. The history matrix is not updated during steps 2–6.

Step 2: The amplifier 40 slews, in about a two second delay period, to the relatively reduced temperature reference value and stabilizes.

Step 3: An updated relatively reduced temperature reference value is recorded for the heater electronics (FIGS. 3, 4A and 4B) being calibrated.

Step 4: The control algorithm is updated using the value of the relatively reduced temperature reference reading taken during step 3, by updating K, IG and AD_REF.

Step 5: The heater electronics are electrically disconnected from the relatively reduced temperature reference resistor 30 and is electrically connected to the detector 22 by switching the appropriate source signal selector 34. Essentially, the detector 22 has replaced the relatively reduced temperature reference resistor 30 in the relevant circuit.

Step 6: The amplifier channel 40 to slews, in about a two second delay period, to the value of the heater 18 thermal energy detector 22 and stabilizes.

Step 7: The algorithm retrieves real time temperature information from the sensor 16, and the history matrix is updated.

Step 8: All remaining heaters 18 undergo steps 1–7 using an associated relatively reduced temperature reference resistor 30.

Step 9: Steps 1–8 are repeated using a relatively increased temperature reference resistor 32. Any "out of range" condition on any relatively decreased of increased reference is reported to an operator as an error by the controller 12.

The above discussion shows how the apparatus and method described herein is able to self-calibrate during operation. The apparatus and method do not need to be shut down or interrupted for calibration.

```
#include "debug.h"
/***********************************************************/
/***********************************************************/
/* CONSTANTS */ define ADC              (*(int *) 0x7FFF)   /* address of AD result */
define LF               (*(char *) 0x9800)  /* A/D line frequency input port */
#define TRACK_STAT_REG   (*(char *) 0x2200)  /* (en)/(dis)able tracks */
#define PMUX             (*(char *) 0x2300)  /* address of A/D muxes */
#define SENS             (*(char *) 0x9000)  /* A/D temprature sensor input port */
#define BUFFER_SIZE      10       /* size of input buffer */
#define INIT_DELTA_TEMP  20       /* # of counts from temprature error */
#define FALSE            0
#define SIZE_HIST        8        /* must be a multiple of 2 and less than 32 */
#define COLD_REF         2        /* value to send to smux for cold ref. resistor */
#define HOT_REF          1        /* value to send to smux for hot ref. resistor */
#define VERSION          2.13     /* used to check for corrupt NVRAM */
#define COLD_REF_OHMS    111.0
#define HOT_REF_OHMS     123.0
#define HOT              1
#define COLD             0
#define LOW_WINDOW       0x80     /* or'ed with sensor before placing in PMUX register */
#define HIGH_WINDOW      0        /* or'ed with sensor before placing in PMUX register */
#define MAXINT           0x7FFF   /* largest signed integer */
#define NUM_SYS_TESTS    8        /* number of possible range tests */
#define ONE_MINUTE       114
#define FIVE_MINUTES     (ONE_MINUTE * 5)    /* # of timer interupts = 5 minutes */
#define FIFTEEN_MINUTES  (ONE_MINUTE * 15)   /* # of timer interupts = 15 minutes */
#define MUX_DELAY        75       /* number of micro seconds to delay for AD to settle */
#define NUM_CYCLES       64
#define NUM_PHASES       5
#define NUM_SENSORS_PER_TRACK  8
#define NUM_TRACKS       6
#define NUM_SENSORS      (NUM_TRACKS * NUM_SENSORS_PER_TRACK)
#define TRUE             1
#define DELTA_REF_OHMS   (HOT_REF_OHMS - COLD_REF_OHMS)
```

```c
#define WARNING0    0   /* sensor is higher or lower than delta temp after a phase */
#define WARNING1    1   /* sensor temp is higher than +delta_temp. */
#define WARNING2    2   /* sensor temp is lower than -delta_temp. */
#define IRQERROR    6   /* no irq interrupts for 25 ms */
define ATDERROR    7   /* A/D is not responding in 1ms */ enum boolean {false, true};
enum get_type {hex, decimal, character};

/************************************************************/
/*  MACROS */
/*  clear all compare flags & load output compare register with time */ define DELAY(time)          ( TFLG1 = 0XFF; TOC2 = TCNT + ((time) >> 3); )
define DISABLE_TIMER_INT    TMSK2 &= 0x7F    /* masks any timer interrupts */
#define ENABLE_RS232         SCCR2 |= 0x2C    /* sets RS232 interupt mask */
#define ENABLE_TIMER_INT     TMSK2 |= 0x80    /* sets timer interupt mask */
#define FINISH_DELAY         while ((TFLG1 & 0x40)  == 0);   /* see delay function */
#define RAM_OK               (version_1 == VERSION && init_data.version == VERSION)

/************************************************************/
/* STRUCTURES */ struct sensor_struct
{
    int           ref[2];          /* ref. resistor readings COLD_REF, HOT_REF */
    unsigned char offset;
    unsigned char gain;
    float         ig;
    float         k;
    float         fixed;
    int           ad_ref;
    float         temp;            /* temperature as input via rs232 */
    signed char   hist[SIZE_HIST]; /* history of avg1 */
    signed char   avg1;            /* amount of power required by this sensor */
```

```c
    signed char    avg2;          /* temporary avg1 */
    unsigned char  status;        /* bit array of range test results */
    int            reading;       /* value read from sensor */
    signed int     sum;           /* value of average reading */
    signed long    randy_sum;     /* The young model of accumulated averages */
    unsigned char  warning;       /* bit array for warning type */
    int            reserved[19];  /* reserved space */
};

extern struct sensor_struct sensor[NUM_TRACKS][NUM_SENSORS_PER_TRACK];

struct systest_struct
{
    char  type;         /* ie: 0: testing sensors, HOT_REF: testing hot ref.) */
    char  test_number;  /* test id number */
    char  window;
    int   lo_limit;
    int   up_limit;
    char  status;       /* track status bit array */
                        /* type == -1 marks end of array) */
};

/* from PROM to NVRAM: all data within this structure */
                        /* will be used to initialize RAM */ struct prom_2_nvram
{                       /* NVRAM copy of SYS_TESTS array */
    struct systest_struct sys_test[NUM_SYS_TESTS];
    int    delta_temp;  /* range sensor temperature may vary from target temp */
    float  version;     /* software version number */
};

extern struct prom_2_nvram init_data;

/******************************************************/
/******************************************************/
```

```
/* GLOBAL VARIABLES LOCATED IN NVRAM */ extern int           temps_loaded;         /* blanket temps. are loaded */
extern char          empty;                /* empty queue flag */
extern char          front, rear;          /* queue position markers*/
extern int           irq_count;            /* #IRQ interrupts before irq_int_hdlr turns itself off */
extern char          phase;
extern char          restart, quit;        /* rs232 flags to restart and quit input*/
extern char          s[BUFFER_SIZE];       /* string for error messages */
extern unsigned char tag[NUM_TRACKS];      /* error tag bit = 1 = error */
extern int           time_counter;         /* used to count time of each phase */
extern float         version_1;
extern char          hist_ptr;             /* index pointer for avg1 histogram */
extern signed char   calibrating;          /* sensor being calibrated */
extern char          cal_count;            /* # of times to call this function befor reading ref. resistor */
extern char          cal_val;              /* value to place in smux for HOT = 1 or COLD = 2 ref. resistor */
extern signed char   slewing;              /* sensor that is slewing during calibration */
extern unsigned char track_status;         /* one bit for each track (disabled == 1) */
extern unsigned char track_warning;        /* one bit for each track (warning == 1) */
extern struct systest_struct *cold_test_ptr;
extern struct systest_struct *hot_test_ptr;
extern struct systest_struct *temp_test_ptr;

/*****************************************************************/
/* CONSTANTS LOCATED IN PROM */
/*****************************************************************/ extern unsigned char *const track_output[];/* pointers to each track address */
extern const char             last_sensor[];
extern unsigned char *const   smux_adr[][2];

/*****************************************************************/
/* CONSTANTS COPIED FROM PROM TO NVRAM AT NVRAM INITIALIZATION */
/*****************************************************************/ extern const struct prom_2_nvram INIT_DATA;
```

```c
/***************************************************************/
/***************************************************************/ include <io6811.h>
include "htr.h"

/* CONSTANTS LOCATED IN PROM */ const char last_sensor[] =
  {          /* last sensor in phase */
   0, 3, 5, 6, 7, 7
  };

/* GLOBALS LOCATED IN NVRAM */ struct sensor_struct sensor[NUM_TRACKS][NUM_SENSORS_PER_TRACK];
float   version_1;
int     irq_count;           /* one of two locations used to test RAM (keep seperate from version_2 */
char    phase;               /* #IRQ interrupts before irq_int_hdlr turns itself off */
char    restart, quit;       /* rs232 flags to restart and quit input*/
char    s[BUFFER_SIZE];      /* string for error messages */
unsigned char tag[NUM_TRACKS]; /* error tag bit = 1 = error */
int     time_counter;        /* used to count time of each phase */
char    hist_ptr;            /* index for histogram */

/* forward reference to functions */
void what_phase();
void calc_fix_adref();
void clr_data_segment();
void init_data_segment();
void init_sensors();
void prom2ram_copy();

/***************************************************************/
/***************************************************************/ void main()
{
```

```
char c, pass, plate, track, plate_bit;

turn_blankets_off();
    temps_loaded = FALSE;
    DISABLE_TIMER_INT;
                              /* initialize */
    OPTION = 0x00;    /* A/D power upon ADPU, Eclock drives A/DCSEL */
    HPRIO  = 0X00;    /* set TOF interrupt to highest priority */
    BAUD   = 0x30;    /* set baud rate to 9600 */
    PACTL  = 0x40;    /* enable pulse accumulator */
    ENABLE_RS232;
    enable_interrupt();
    clr_data_segment();           /* Initialize segments */
    TRACK_STAT_REG = 0;           /* Enable tracks */
    pause(ONE_MINUTE * 3);        /* wait for blankets to cool down */ while (temps_loaded == FALSE)
        ;                         /* wait for valid temps. data */
    test_system();                /* complete test of boards & sensors */
                                  /* calibrate */
    calc_fix_adref();

PMUX = 0;                     /* address sensor zero so it will have settled */
    DELAY(MUX_DELAY + 400);       /* when we get around to reading it later */
    calc_power_req(HIGH_WINDOW, MUX_DELAY);

phase = 0;
    while (TRUE)
    {
        if (phase++ == 0)
            calibrating = -1;
        else if (calibrating == -1)                  /* start on the 'fly' calibrations */
        {
            calibrating = cal_count = 0;             /* start with sensor zero */
            slewing = -1;                            /* no sensors are slewing yet */
            cal_val = COLD_REF;                      /* begin with cold ref. resistor */
```

```
}
switch(phase)
{
case 1:
case 2:
case 3:
        time_counter = FIVE_MINUTES;    /* phases 1-3 */
        ENABLE_TIMER_INT;
        break;

case 4:
        time_counter = FIFTEEN_MINUTES; /* phase 4 */
        ENABLE_TIMER_INT;
        break;

default:
        break;
} while ( (phase == 5) || time_counter )
calc_power_req(HIGH_WINDOW, MUX_DELAY);
distribute_power();

DISABLE_TIMER_INT;
/* check for sensors that did not heat up correctly */
for (track = 0; track < NUM_TRACKS; track++)
{
    plate_bit = 0x01;
    pass = tag[track];
    for (plate = 0; plate <= last_sensor[phase]; plate++)
    {
        if (pass & plate_bit)   /* tag == 1 if error */
        {
            sensor[track][plate].warning |= (1 << WARNING0);   /* sensor warning */
            track_warning |= (1 << track);                     /* track warning */
        }
    }
}
```

```c
        plate_bit <<= 1;    /* next sensor */
    }
}

/**********************************************************************/
/**********************************************************************/
void calc_fix_adref()
{
    struct sensor_struct *s_ptr;
    float temperature;

for (s_ptr = &sensor[0]; s_ptr < &sensor[0] + NUM_SENSORS; s_ptr++)
    {
        temperature = (s_ptr->offset - 128.0) / 50.0 +
                      s_ptr->temp * (9833.44 + s_ptr->gain) / 9959.31;
        s_ptr->fixed = 100.0 +
                       (0.390802 * temperature) +
                       (-0.0000580195 * temperature * temperature);

s_ptr->ad_ref = (0.5 + (s_ptr->k - s_ptr->ig * s_ptr->fixed));
    }
}

/**********************************************************************/
/**********************************************************************/
void clr_data_segment()
{
    clr_data_seg();         /* assembly routine to zero data segment */
    init_data_segment();    /* initialize data segment */
}

/**********************************************************************/
void init_data_segment()
{
```

```
char i, j;
char *p1, *p2;
           /* version number for later tests of RAM */
version_1 = VERSION;
   init_sensors();
   prom2ram_copy();    /* initialize NVRAM from PROM */
}
/*...................................................*/
```

```
/*******************************************************************************/
include <io6811.h>
include "htr.h"

/* CONSTANTS */
define INTEG 0.2 /* CONSTANT OF FEED FORWARD INTEGRATION */ define Kp   1    /* proportional constant */
define KI   5    /* integration constant */
define Kr   0    /* number of right shifts (aka: number of divide by 2's) */ define NUM_CALIBRATE_READS 4   /* number of reads before read ref. resistor */ if SIZE_HIST == 16
define AVG_SHIFT 4
endif if SIZE_HIST == 8
define AVG_SHIFT 3
endif if SIZE_HIST == 4
define AVG_SHIFT 2
endif if SIZE_HIST == 2
define AVG_SHIFT 1
#endif

/* MACROS */
/* determine index (either 0 or 1) for smux_adr */
#define SMUX_INDEX(a)      ( ((a) & 0x0C) >> 2 )
#define REF_INDEX(a)       ( ((a) >> 1) ^ 1 )
#define CAL_MASK(val, sen) ( (val) << (((sen) - ((sen) & 0x0C)) << 1) )
#define ABS(a)             ( (a) < 0 ? -(a) : (a) )
```

```c
/* CONSTANTS LOCATED IN PROM */
unsigned char *const smux_adr[][2] =
{
    /* sensors 0 .. 3 */   /* sensors 4..7 */
    { (unsigned char *) 0x2400, (unsigned char *) 0x2440 },
    { (unsigned char *) 0x2480, (unsigned char *) 0x24C0 },
    { (unsigned char *) 0x2500, (unsigned char *) 0x2540 },
    { (unsigned char *) 0x2580, (unsigned char *) 0x25C0 },
    { (unsigned char *) 0x2600, (unsigned char *) 0x2640 },
    { (unsigned char *) 0x2680, (unsigned char *) 0x26c0 }
};

/* GLOBALS */
signed char calibrating;    /* sensor being calibrated */
signed char slewing;        /* last sensor calibrated (still slewing) */
char        cal_count;      /* # of times to call this function befor reading ref. resistor */
char        cal_val;        /* value to place in smux for HOT = 1 or COLD = 2 ref. resistor */ ifdef DEBUG
char xfl[13];
endif struct {
    int             ref[2];
    unsigned char   *address[2];
    char            val[2];
    char            slew[2];
    char            fill[4];    /* filler to align nicely during debug */
} x[NUM_TRACKS][NUM_SENSORS_PER_TRACK];

#endif

/****************************************************/
/****************************************************/
void calc_power_req(char window, int mux_delay)
```

```
{
    signed char    adjust;
    int            value, sum, track;
    signed int     result;
    signed int     tmp_result;
    unsigned char  *tag_ptr, pass, col_bit;
    char           i, j, sens;
    struct sensor_struct *s_ptr;

/* initialize pointers */
    tag_ptr = tag;
    s_ptr = &sensor[0];
    line_freq();    /* make sure power is off */
    for (track = sens = 0; track < NUM_TRACKS; track++)    /* scan all sensors */
    {
        col_bit = 1;
        pass = 0;
        for (i = 0; i < NUM_SENSORS_PER_TRACK; i++, sens++, s_ptr++, col_bit <<= 1)
        {
            if (calibrating != -1)        /* are we calibrating ? */
            {
                if (slewing == sens)       /* are we slewing ? */
                {
                    PMUX = (sens + 1) | window;   /* yes.. address next sensor */
                    DELAY(mux_delay);
                    continue;                     /* and skip this sensor */
                }
                if (sens == calibrating)   /* are we calibrating this sensor ? */
                {
                    if (cal_count == 0)    /* first time here for this sensor? */
                    {                      /* call this function 'cal_count' times before reading reference resistor */
                        cal_count = NUM_CALIBRATE_READS;
#ifdef DEBUG
                        x[track][i].val[REF_INDEX(cal_val)] = CAL_MASK(cal_val, i);
                        x[track][i].address[REF_INDEX(cal_val)] = smux_adr[track][SMUX_INDEX(i)];
                        x[track][i].slew[REF_INDEX(cal_val)] = slewing;
#endif
```

```
                                                                                        CAL STEP 2
*smux_adr[track][SMUX_INDEX(i)] = CAL_MASK(cal_val, i); /* set mux to ref. resistor */

/* use average of histogram for power distribution */                                   CAL STEP 3
                                                                                        CAL STEP 1B
for (j = sum = 0; j < SIZE_HIST; j++)
    sum += s_ptr->hist[j];
s_ptr->avg2 = s_ptr->avg1 = (sum >> AVG_SHIFT);

else if (--cal_count == 0)    /* time to read ref resistor ? */                         CAL STEP 4
{
    /* read the reference resistor */
    s_ptr->ref[REF_INDEX(cal_val)] = read_ref();
#ifdef DEBUG
    x[track][i].ref[REF_INDEX(cal_val)] = s_ptr->ref[REF_INDEX(cal_val)];               CAL STEP 5
endif                                                                                  CAL STEP 6 s_ptr->ig     = (s_ptr->ref[COLD] - s_ptr->ref[HOT]) / DELTA_REF_OHMS;
    s_ptr->k      = (s_ptr->ig * COLD_REF_OHMS) + (s_ptr->ref[COLD]);
    s_ptr->ad_ref = (0.5 + (s_ptr->k - s_ptr->ig * s_ptr->fixed));

*smux_adr[track][SMUX_INDEX(i)] = 0;   /* set smux to read sensor next time */
    slewing = sens;       /* give it time to slew */

/* only calibrate sensors in earlier phases */ if ((++calibrating & 0x07) > last_sensor[phase - 1])
        calibrating = (track + 1) << 3;  /* 1st sensor on next track */ if (calibrating >= NUM_SENSORS)
    {   /* all have been calibrated, toggle ref. resistors */                           CAL STEP 9
        calibrating = 0;  /* back to first sensor on track zero */
        cal_val = (cal_val == COLD_REF) ? HOT_REF : COLD_REF;                           CAL STEP 1A
    }
}
```

```
              PMUX = (sens + 1) | window;   /* address next sensor */
              DELAY(mux_delay);
              continue;                      /* and skip to next sensor */
          }                                                                              CAL STEP 8

FINISH_DELAY;            /* wait till mux and opamps settle */
      value = read_sensor();   /* average of two reads */

/* has temp. varied beyond allowable limits ? */
      if (s_ptr->temp && s_ptr->status == 0 && phase)
      if (temp_test_ptr && temp_test_ptr->type != -1)
              sens_range(temp_test_ptr, s_ptr, ABS(s_ptr->reading - value), track);

s_ptr->reading = value;
      PMUX = (sens + 1) | window;  /* address next sensor so it can start settling */
      DELAY(mux_delay);
          tmp_result = (s_ptr->reading - s_ptr->ad_ref + 8);                             STEP 2
          if (ABS(tmp_result) < 0x100 )
          {
              s_ptr->randy_sum += tmp_result - (s_ptr->randy_sum >> 7);                  STEP 3
          }
          else
              s_ptr->randy_sum = 0;
          result = ((Kp * tmp_result + (Ki * (s_ptr->randy_sum >> 8))) >> Kr ) >> 4;     STEP 4
          if (result <= 0)
              s_ptr->avg1 = s_ptr->randy_sum = NUM_CYCLES + 1; /* set for no power */
          else
          {
              s_ptr->avg2 = 1;     /* all sensors get first pulse */
              /* set number of cycles to apply power */
              switch (result)                                                            STEP 5
              {
                  case 1: s_ptr->avg1 = 16; break;   /* 32 cycles (2) */
                  case 3: s_ptr->avg1 =  8; break;   /* 16 cycles (4) */
                  case 5: s_ptr->avg1 =  4; break;   /*  8 cycles (8) */
                  case 7: s_ptr->avg1 =  2; break;   /*  4 cycles (16) */
```

STEP 1

```
        case 2: s_ptr->avg1 = 16; break;        /* 32 cycles (2) */
        case 4: s_ptr->avg1 = 8; break;         /* 16 cycles (4) */
        case 6: s_ptr->avg1 = 4; break;         /* 8 cycles (8) */
        case 8: s_ptr->avg1 = 1; break;         /* 2 cycles (32) */

/* power every cycle when on full */
        default: s_ptr->avg1 = 0; break;
        }

/* adjust to full power scale if appropriate for current phase */
    if ((phase < 4) && (i < last_sensor[phase]))
        s_ptr->avg1 <<= 1;
    if (s_ptr->avg1 < 0)          /* avoid negative avg1 */
        s_ptr->avg1 = s_ptr->avg2 = NUM_CYCLES + 1;
    s_ptr->hist[hist_ptr] = s_ptr->avg1;          /* update histogram */
    if (((unsigned int)result > init_data.delta_temp)
        && ((unsigned int)result < 0x7ff ))  /* close to temp or unused */
    {
        pass |= col_bit;    /* tag == 1 means not close to temp */
        if (s_ptr->temp && s_ptr->status == 0)
        if (phase == 5)
        {
            s_ptr->warning |= (1 << WARNING1);       /* sensor warning */
            track_warning |= (1 << track);           /* track warning */
        }
    }
    else if ((((unsigned int)result < -init_data.delta_temp)
            && ((unsigned int)result > 0x8000) && (phase == 5))
    {
        if (s_ptr->temp && s_ptr->status == 0)
        {
            s_ptr->warning |= (1 << WARNING2);       /* sensor warning */
            track_warning |= (1 << track);           /* track warning */
        }
    }
}
```

```
        }
        *tag_ptr++ = pass;  /* load tag with results for track */
FINISH_DELAY:
        }

/* read sensor zero so it has time to settle for next call to this function */
        PMUX = window;
        DELAY(mux_delay + 400);

if (++hist_ptr >= SIZE_HIST)
                hist_ptr = 0;
}
/**************************************************************/
/**************************************************************/
```

```
/*****************************************************************************
 *
 * module:     distpwr.c
 * purpose:    distribute power to sensors
 * functions:  distribute_power()
 *
 * programmer:
 * modified by:
 *
 * date:       3/89
 *
 * notes:      main() will call calc_pwr_req() followed by distribute_power()
 *             endlessly.  this module uses the information provided by
 *             calc_pwr_req() to distribute the proper amount of power
 *             to the correct sensors.
 *
 */ include <io6811.h>
include "htr.h"

/*****************************************************************************/
void distribute_power()
{
    struct sensor_struct *s_ptr, *slew_ptr;
    char cycle, i, pass, col_bit, sens;
    int track;
    for (cycle = 0; cycle < NUM_CYCLES; cycle++)
    {
        sens = 0;
        s_ptr = &(sensor[0]);
        for (track = 0; track < NUM_TRACKS; track++)
        {
            col_bit = 1;
            pass = 0;
```

STEP 6

STEP 7

```
for (i = 0; i < NUM_SENSORS_PER_TRACK; i++, s_ptr++, sens++, col_bit <<= 1)
{
    /* skip this one if temperature is zero */
    if (s_ptr->temp)
    {
        /* if calibrating 'on the fly' make sure ref. resistors */
        /* are still in range */
        if (sens == slewing && cycle == 1 && cal_count == 4)
        {
            slew_ptr = &sensor[0] + slewing;
            /* do this test only if it exists in sys_test[] and the test is enabled */
            if (slew_ptr->status == 0)    /* don't test a disabled sensor */
            {
                if (cold_test_ptr && cold_test_ptr->type != -1)
                    sens_range(cold_test_ptr, slew_ptr, slew_ptr->ref[COLD], track);

if (hot_test_ptr && hot_test_ptr->type != -1)
                    sens_range(hot_test_ptr, slew_ptr, slew_ptr->ref[HOT], track);
            }
        }

/* give it a pulse if in full power */
        /* or every other row (not same parity) */
        if ( (phase == 1) ||
             (phase < 4) && (i > last_sensor[phase - 1]) ||
             ((cycle^i) & 0x01) )
        {
            if (--(s_ptr->avg2) <= 0)
            {
                pass |= col_bit;
                switch(phase)
                {
                    case 1:
                        pass &= 0x0F;
                        break;

case 2:
```

STEP 8

```
                pass &= 0x3F;
                break;
            case 3:
                pass &= 0x7F;
                break;
            default:
                break;
        }
        s_ptr->avg2 = s_ptr->avg1; /* reload original */
    }
    *track_output[track] = pass;        /* output powermask */
}
/* find zero crossing to guarantee that power was applied */
line_freq();
turn_blankets_off();
}
/*****************************************/
/*****************************************/
/*****************************************/
```

STEP 1 -- MORE DETAIL

```
/****************************************************************
 *
   module:    readsen.c
   purpose:   read sensor
   functions: read_sensor(), read_ref()

programmer:

date:

input:    none
   output:   average of two reads example:  N/A notes:    code is optimized for speed.
 */ include <io6811.h>
include "htr.h"

/****************************************************************
 * read sensor twice; return average result                      */
/****************************************************************/
int read_sensor()
{
    char i, plate, track;
    int adr, time_out_cnt;
    time_out_cnt = 1000;
    PACNT = -2;              /* set pactl to count two pulses from ADC */
    TFLG2 = 0x20;            /* clear the overflow flag */
    while ((((TFLG2 & 0x20) == 0) &&   /* wait until A/D is finished */
            (time_out_cnt > 0 ))
    {
        --time_out_cnt;
    }
```

```c
if (time_out_cnt > 0)
{
    time_out_cnt = 1000;
    adr = ADC;
    PACNT = -2;        /* set pactl to count two pulses from ADC */
    TFLG2 = 0x20;      /* clear the overflow flag */
    while (((TFLG2 & 0x20) == 0) &&    /* wait until A/D is finished */
           (time_out_cnt > 0 ))
    {
        --time_out_cnt;
    }
    if (time_out_cnt > 0)
        return( (adr + ADC) >> 1);
}
turn_blankets_off();
for (track = 0; track < NUM_TRACKS; track++)
{
    for (plate = 0; plate < (NUM_SENSORS_PER_TRACK ); plate++)
    {
        sensor[track][plate].status |= (1 << ATDERROR);   /* set sensor error */
    }
    TRACK_STAT_REG = (track_status |= (1 << track));  /* disable and mark track */
}
return(0);
}
/*****************************************************************/
/*     read sensor four times: return average result             */
/*****************************************************************/
int read_ref()
{
    int tmp;
    tmp = read_sensor();
    return ( (tmp + read_sensor() ) >> 1 );
}
/*****************************************************************/
```

42

```c
/*
module:      blksoff.c
purpose:     turn blankets off programmer:

date:        2/89 input:       none
output:      writes 0 to registers pointed to by track_output[]

example:     N/A notes:       this code is optimized for speed. Don't replace
             it with a loop!
             conditional compile statements allow NUM_TRACKS
             to determine how many elements are in the array.
*/
include <io6811.h>
include "htr.h"

/* CONSTANTS LOCATED IN PROM */
unsigned char *const track_output[] = {    /* pointers to each track address register*/
        (unsigned char *) 0x2000,
        (unsigned char *) 0x2040,
        (unsigned char *) 0x2080,
        (unsigned char *) 0x20C0,
        (unsigned char *) 0x2100,
        (unsigned char *) 0x2140
};

void turn_blankets_off()
{
#if NUM_TRACKS > 0
        *track_output[0] = 0;
#endif
```

```
#if NUM_TRACKS > 1
    *track_output[1] = 0;
#endif
#if NUM_TRACKS > 2
    *track_output[2] = 0;
#endif
#if NUM_TRACKS > 3
    *track_output[3] = 0;
#endif
#if NUM_TRACKS > 4
    *track_output[4] = 0;
#endif
#if NUM_TRACKS > 5
    *track_output[5] = 0;
#endif
#if NUM_TRACKS > 6
    *track_output[6] = 0;
#endif
#if NUM_TRACKS > 7
    *track_output[7] = 0;
#endif
)
```

```
/*****************************************************************************/
/*
module:     irq.c
purpose:    handle irq interrupt functions:  line_freq(),  irq_int_hdlr();

programmer:
date:

input:      none
output:     none example:    /* continue program execution after zero crossing */
            line_freq();
            ..more code..

notes:      code will loop within line_freq untill zero crossing

*/
/*****************************************************************************/ include <Io6811.h>
include "htr.h"

/* CONSTANTS */
#define MIN_IRQ_COUNT   10

/* MACROS */
#define IRQ_INT_ON    LF = 1
#define IRQ_INT_OFF   SENS = 1

/*****************************************************************************/
/*
*/
void line_freq()
{
    char i, plate, track;
```

```
unsigned int time_out_cnt;
    /* wait for line to go high */
    /* fall out of this loop when interrupt stops interrupting */
    /* or 60 ms elapsed */
time_out_cnt = 60000;
do
{
    irq_count = 1;
    IRQ_INT_ON;
    --time_out_cnt;
} while ( ((irq_count <= 0) && (time_out_cnt > 0 ) );
                                    /* wait for line to go high */
if (time_out_cnt != 0)
{
    time_out_cnt = 60000;
    irq_count = MIN_IRQ_COUNT;
    IRQ_INT_ON;
    do
    {
        --time_out_cnt;
    } while ( ((irq_count > 0) && (time_out_cnt > 0 ) );
}
if (time_out_cnt == 0)
{
    IRQ_INT_OFF;
    turn_blankets_off();
    for (track = 0; track < NUM_TRACKS; track++)
    {
        for (plate = 0; plate < (NUM_SENSORS_PER_TRACK); plate++)
            sensor[track][plate].status |= (1 << IRQERROR);  /* set sensor error */
        TRACK_STAT_REG = (track_status |= (1 << track));  /* disable and mark track */
    }
}
```

```
/*****************************************************************/
/* function: irq_int_hdlr                                        */
/* purpose:  handle an irq interrupt                             */
/*                                                               */
/* input:    none                                                */
/* output:   none                                                */
/* theory:   when an interrupt occurs decriment irq_count until  */
/*           it reaches zero then turn off the interrupt         */
/*                                                               */
/* notes:    it is never neccessary to turn off this interrupt   */
/*           since it turns itself off                           */
/*****************************************************************/
void irq_int_hdlr()
{
    if (--irq_count <= 0)
        IRQ_INT_OFF;
}
/*****************************************************************/
```

```
/******************************************************************************
/*
module:    systest.c
purpose:   system test of hardware for faults at program start programmer:
date:

input:     data in sys_test[]

output:    writes status byte to TRACK_STATUS_REG
           each bit represents a track to (0) enable or (1) disable theory:    sys_test is an array of data that drives the tests herein.
           See prom2ram.c for the format of the sys_test structure and
           to update its data. The array is downloaded from the PROM once
           when the NVRAM is initialized. The data may then be altered
           without changing the PROM in order to change the type of test,
           its data range, or to eliminate the test entirely.

Each test expects its own unique format.
           The sensor and the ref. resistor tests expect the following data:
              test type = 0 for sensor, HOT/COLD_REF for ref. resistor test
              window    = high or low
              lower limit of range check
              upper limit of range check
              and a byte for the result of the tests (which tracks failed)

The driver/analog board test expects:
              test type 6
              delta range that temperature reading must change during test
              low window lower limit
              upper window upper limit
              and a byte for the result To eliminate a test change its test type to -1.
``` notes: if a sensor fails a test its entire track is disabled.
a sensor is only tested if it has been assigned a temperature
during field testing the driver/analog test delta range
can be changed to 0x10 by replacing its value. Since
NVRAM won't be re-initialized unless it is corrupted,
this change will be permanent.

Additional tests can be added.

Revisions:

10/19/92, ver. 103, Paul Ericson, Modified system test 6.

*/
/*****************************************************************************/ include <io6811.h>
include "htr.h"

/* CONSTANTS */
define CALIB_ADDITIVE_DELAY    10000  /* extra delay during calibration.*/

/* FORWARD REFERENCES TO FUNCTIONS */
int check_range(struct systest_struct *t_ptr, char offset);
void open_window(char window);
void fail_sensor(struct systest_struct *t_ptr, struct sensor_struct *s_ptr, int track);

/* MACROS */      /* determine offset of data into sensor array */
define OFFSET(a)        ((char *)&(sensor[0][0]).a) - (char *)&(sensor[0]))
                /* toggle window */
define SWAP_WINDOW(w)   ((w) = ((w) == LOW_WINDOW) ? HIGH_WINDOW : LOW_WINDOW)

```
/* GLOBAL VARIABLES */
unsigned char  track_status;      /* one bit for each track (disabled == 1) */
unsigned char  track_warning;     /* one bit for each track (warning == 1) */
struct systest_struct  *cold_test_ptr, *hot_test_ptr, *temp_test_ptr;

/*********************************************************************/
/*
    function:   test_system()
    purpose:    run all tests in sys_test[]

input:      none
    output:     writes track status byte to enable/disable tracks Revisions:

10/19/92, ver. 103, Paul Ericson, Initialize secondary mux to select
                       sensor before performing test 6.

*/
/*********************************************************************/
unsigned char  mask[2];                              /* live sensors in (0)low window or (1) hi wind */
int            max[NUM_SENSORS_PER_TRACK];           /* initial readings during test #6 */
int            result[NUM_SENSORS_PER_TRACK];        /* final readings during test #6 */ void test_system()
{
    char           last_window, offset, test;
    int            i, j, track;
    unsigned char  w;

struct systest_struct  *ptr;
    struct sensor_struct   *s_ptr;

phase = 0;
    init_sensors();         /* initialize sensors */
    track_status = 0;       /* start out with a clean slate */
```

```c
track_warning = 0;  /* start out with a clean slate */
last_window = 0;

/* prevent 'on the fly' calibration range test unless test exists */
cold_test_ptr = hot_test_ptr = 0;

turn_blankets_off();

/* perform tests */
for (test = 0, ptr = init_data.sys_test; test < NUM_SYS_TESTS; ptr++, test++)
{
    switch (ptr->type)
    {
        case -1:    /* skip this test */
            break;

case 0: /* test sensors */
            last_window = ptr->window;
            open_window(ptr->window);
            calc_power_req(ptr->window, CALIB_ADDITIVE_DELAY);  /* give PMUX extra time to slew */
            track_status |= check_range(ptr, OFFSET(reading));  /* read all sensors */
            break;

case HOT_REF:   /* test ref. resistors */
            hot_test_ptr = ptr;  /* will need for 'on the fly' calibrating */

/* no break here... handle same as COLD_REF */ case COLD_REF:
            if (ptr->type == COLD_REF)  /* note: HOT_REF falls into here too */
                cold_test_ptr = ptr;    /* for 'on the fly' calibrating */

/* read_ref_resistors() takes forever! */
            /* don't read again unless window changed */

/* if (last_window != ptr->window) */
```

```c
    last_window = ptr->window;
    open_window(ptr->window);            /* give PMUX extra time to slew */
    read_ref_resistors(ptr->window);     /* read the ref. resistors */
} offset = ptr->type == HOT_REF ? OFFSET(ref[HOT]) : OFFSET(ref[COLD]);

track_status |= check_range(ptr, offset);
break;

case 6: /* driver analog board correlation test */

/* reset secondary muxes to read sensors */
for (track = 0; track < NUM_TRACKS; track++)
{
    *smux_adr[track][0] = 0;
    *smux_adr[track][1] = 0;
}
pause(4);

for (track = 0; track < NUM_TRACKS; track++)
{   /* get high & low window readings for all sensors this track */
    mask[0] = mask[1] = 0;
    for (j = 0; j < NUM_SENSORS_PER_TRACK; j++)
        max[j] = 0;
    for (i = 0, w = HIGH_WINDOW; i < 2; i++, SWAP_WINDOW(w))
    {
        open_window(w);
        calc_power_req(w, CALIB_ADDITIVE_DELAY);
        for (j = 0, s_ptr = &(sensor[track][0]); j < NUM_SENSORS_PER_TRACK; j++, s_ptr++)
        {   /* if sensor was assigned a temperature then test it */
            if (s_ptr->temp)
            {
#ifdef DEBUG
                s_ptr->reserved[j] = s_ptr->reading;
#endif
```

```c
            /* compare reading to correct (up/lo) limit */
            if (s_ptr->reading < ptr->up_limit && s_ptr->reading > ptr->lo_limit )

if (w == HIGH_WINDOW)
            {
                max[j] = s_ptr->reading;
                mask[0] |= (1 << j);
            }

/* only do low window if failed high window */
            if (w == LOW_WINDOW && max[j] == 0)
            {
                max[j] = s_ptr->reading;
                mask[1] |= (1 << j);
            }
            else if (w == LOW_WINDOW && max[j] == 0)
                fail_sensor(ptr, s_ptr, track);
        }
    }

/* don't apply power to this track if no sensors need testing */
    if (mask[0] || mask[1])
    {
        /* apply power for this track */
        *track_output[track] = (mask[0] | mask['1']);

pause(30);              /* wait 15 seconds */
        *track_output[track] = 0;     /* turn off power */

/* now read sensors to see if they've heated up sufficiently */
        /* NOTE: get them while there hot, get results and examine them later */ for (i = 0, w = HIGH_WINDOW; i < 2; i++, SWAP_WINDOW(w))
        {
            open_window(w);
            calc_power_req(w, CALIB_ADDITIVE_DELAY);
```

```
            for (j = 0, s_ptr = &(sensor[track[0]); j < NUM_SENSORS_PER_TRACK; j++, s_ptr++)
              if (mask[j] & (1 << j))
              {                                    /* get result from correct window */
                result[j] = s_ptr->reading;

#ifdef DEBUG
                s_ptr->reserved[4] = (track << 3) + j;
                s_ptr->reserved[j + 2] = s_ptr->reading;
#endif
              }

/* all sensors have been read from both windows */
            /* if sensor failed to heat up sufficiently then track fails */
            for (j = 0, s_ptr = &(sensor[track]); j < NUM_SENSORS_PER_TRACK; j++, s_ptr++)
            {   /* NOTE: ptr->window holds range delta for this test */
              if (max[j] && (max[j] - result[j]) < ptr->window)
                fail_sensor(ptr, s_ptr, track);
            }
          }
          break;

case 7:
          temp_test_ptr = ptr;      /* delta temp for 'on the fly' test */
          break;

default:
          break;
      }
    }
    TRACK_STAT_REG = track_status;    /* (en)/(dis)able tracks */
    open_window(HIGH_WINDOW);         /* leave on a 'high note' */
  }
```

```c
/*****************************************************************************
 *
 * function:  check_range()
 * purpose:   test all sensor readings for out of range condition
 *
 * input:     test:   indexes into sys_test[test]
 *                    offset: byte offset into sensor structure to find data
 *                    to be tested
 *
 * output:    updates sys_test result with track status byte for this test
 *            returns track status byte for this test
 *
 *****************************************************************************/
int check_range(struct systest_struct *t_ptr, char offset)
{
    char test_bit, track, track_bit, i;
    int val;
    struct sensor_struct *s_ptr;

s_ptr = &sensor[0];
    track_bit = 1;
    test_bit = 1 << t_ptr->test_number;
    t_ptr->status = 0;       /* start with status == ok */ for (track = 0; track < NUM_TRACKS; track++, track_bit <<= 1)
    {
        for (i = 0; i < NUM_SENSORS_PER_TRACK; i++, s_ptr++)
        {
            s_ptr->status &= ~test_bit;  /* clear bit (assume sensor will pass) */
            val = *((int *)((char *)(s_ptr) + offset));   /* test this value */
            /* note: only test sensor if it is assigned a temperature */
            if (s_ptr->temp && (val < t_ptr->lo_limit || val > t_ptr->up_limit))
            {
                s_ptr->status |= test_bit;   /* sensor failed this test */
                t_ptr->status |= track_bit;  /* therefore track failed */
            }
        }
    }
}
```

```c
        return (t_ptr->status);
}
/****************************************************************/
/*
function:   open_window()
purpose:    switch window and allow time for slewing input:      window
output:     none
*/
void open_window(char window)
{
        /* when switching windows allow extra time to slew */
        PMUX = window;
        DELAY(100000);
}
/****************************************************************/
/****************************************************************/
void fail_sensor(struct systest_struct *t_ptr, struct sensor_struct *s_ptr, int track)
{
        s_ptr->status   |= (1 << t_ptr->test_number);   /* sensor failed ... */
        track_status    |= (1 << track);                /* therefore track failed */
        t_ptr->status   |= (1 << track);                /* record tracks failed this test */
}
/****************************************************************/
```

```
/*******************************************************************************/
/*
module:    readref.c
purpose:   read hot and cold reference resistors
           calculate ig, k, and fixed for all op amps programmer:
date:

input:     window value to be or'ed with PMUX
output:    none example:   On track 0 read hot reference for op amp 5 and
           read cold reference for op amp 4.

smux[0][1] = 0x06;  /* address secondary muxes from table above */
           smux[0][0] = 0x00;

pmux = 04 ;         /* address primary mux for op amp 4 */
           delay;
           read_sensor();

pmux = 5;           /* repeat for op amp 5 */
           delay;
           read_sensor();

*/
/*******************************************************************************/ include <io6811.h>
include "htr.h"

#define LSB  1    /* least signif. byte of mask */
#define MSB  0    /* most  signif. byte of mask */

/*******************************************************************************/
```

```c
/* function:   read_ref_resistors()                                              */
/* purpose:    read hot & cold reference resistors                               */
/*             put results in sensor array                                       */
/* input:      window to be or'ed with PMUX                                      */
/* output:     none                                                              */
/******************************************************************************/
void read_ref_resistors(char window)
{
    union
    {
        unsigned int i;    /* treat mask as an integer */
        unsigned char c[2]; /* treat mask as a char */
    } mask;

char hot, cold, track, column;
    struct sensor_struct *s_ptr;

/* hot == 0..7, cold == 7,1,2..6, mask == 0x8001, 0x0006, ... 0xc000 */
    for (hot = 0, cold = 7, mask.i = 0x8001; hot < NUM_TRACKS; track++)
    {
        for (track = 0; track < NUM_TRACKS; track++)
        {
            *smux_adr[track][0] = mask.c[LSB];
            *smux_adr[track][1] = mask.c[MSB];
        }
        pause(4);    /* wait 2 seconds */
        for (track = 0; track < NUM_TRACKS; track++)
        {
            PMUX = ((track << 3) + hot) | window;
            DELAY(MUX_DELAY);
            FINISH_DELAY;
            sensor[track][hot].ref[HOT] = read_sensor();
            PMUX = ((track << 3) + cold) | window;
            DELAY(MUX_DELAY);
            FINISH_DELAY;
            sensor[track][cold].ref[COLD] = read_sensor();
```

```
          }
          mask.i = mask.i == 0x8001 ? mask.i = 0x0006 : mask.i << 2;
          ++hot;
          if (++cold == 8)
              cold = 0;
      }
      for (s_ptr = &sensor[0]; s_ptr < &sensor[0] + NUM_SENSORS; s_ptr++)
      {
          s_ptr->ig = (s_ptr->ref[COLD] - s_ptr->ref[HOT]) / DELTA_REF_OHMS;
          s_ptr->k = (s_ptr->ig * COLD_REF_OHMS) + (s_ptr->ref[COLD]);
      }
      /* reset secondary muxes to read sensors */
      for (track = 0; track < NUM_TRACKS; track++)
      {
          *smux_adr[track][0] = 0;
          *smux_adr[track][1] = 0;
      }
  }
```

What is claimed is:

1. A method of thermally controlling an instrument including a heater while the heater is in continuous operation, the method comprising the steps of:
   (a) electrically connecting a heater with a relatively reduced thermal energy reference resistor;
   (b) allowing an amplifier operatively associated with the heater to slew to a relatively reduced thermal energy value;
   (c) recording the relatively reduced thermal energy value in memory;
   (d) updating an algorithm controlling the heater based on the relatively reduced thermal energy value;
   (e) electrically connecting the heater with a detector for sensing thermal energy produced by the heater;
   (f) allowing the amplifier to slew to a value associated with the detector;
   (g) updating an algorithm controlling the heater based on the value associated with the detector; and
   (h) applying electrical energy to the heater based on the relatively reduced thermal energy value and the value associated with the detector.

2. A method as defined in claim 1 further comprising the step of:
   (i) repeating steps (a) through (h).

3. A method as defined in claim 1 further comprising the step of:
   (i) signaling heater status to an operator.

4. A method of thermally controlling an instrument including a heater while the heater is in continuous operation, the method comprising the steps of:
   (a) electrically connecting a heater with a relatively increased thermal energy reference resistor;
   (b) allowing an amplifier operatively associated with the heater to slew to a relatively increased thermal energy value;
   (c) recording the relatively increased thermal energy value in memory;
   (d) updating an algorithm controlling the heater based on the relatively increased thermal energy value;
   (e) electrically connecting the heater with a detector for sensing thermal energy produced by the heater;
   (f) allowing the amplifier to slew to a value associated with the detector;
   (g) updating an algorithm controlling the heater based on the value associated with the detector; and
   (h) applying electrical energy to the heater based on the relatively increased thermal energy value and the value associated with the detector.

5. A method as defined in claim 4 further comprising the step of:
   (i) repeating steps (a) through (h).

6. A method as defined in claim 4 further comprising the step of:
   (i) signaling heater status to an operator.

* * * * *